United States Patent
Sato

(10) Patent No.: US 11,070,145 B2
(45) Date of Patent: Jul. 20, 2021

(54) POWER CONVERSION CONTROL METHOD AND POWER CONVERSION CONTROL DEVICE

(71) Applicant: Nissan Motor Co., Ltd., Kanagawa (JP)

(72) Inventor: Sho Sato, Kanawaga (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 16/977,908

(22) PCT Filed: Mar. 7, 2018

(86) PCT No.: PCT/JP2018/008850
§ 371 (c)(1),
(2) Date: Sep. 3, 2020

(87) PCT Pub. No.: WO2019/171514
PCT Pub. Date: Sep. 12, 2019

(65) Prior Publication Data
US 2021/0021189 A1 Jan. 21, 2021

(51) Int. Cl.
*H02M 7/493* (2007.01)
*H02M 7/5395* (2006.01)
(Continued)

(52) U.S. Cl.
CPC ......... *H02M 7/493* (2013.01); *H02M 7/5395* (2013.01); *H02M 7/53873* (2013.01);
(Continued)

(58) Field of Classification Search
CPC ............. H02M 7/493; H02M 7/53873; H02M 7/5395; H02M 1/008; H02P 5/46
See application file for complete search history.

(56) References Cited

U.S. PATENT DOCUMENTS 5,142,468 A * 8/1992 Nerem .................... H02M 7/48
363/71
7,466,086 B2 * 12/2008 Kiuchi ...................... H02P 5/74
318/400.07
(Continued)

FOREIGN PATENT DOCUMENTS

JP 2002-300800 A 10/2002

*Primary Examiner* — Jue Zhang
(74) *Attorney, Agent, or Firm* — Osha Bergman Watanabe & Burton LLP

(57) ABSTRACT

Provided is a power conversion control method including: calculating a pre-switching pulse time being a time from a first conductive state switching timing being a conductive state switching timing of a second bridge circuit immediately before a predetermined carrier wave switching timing, to the carrier wave switching timing; calculating a post-switching pulse time being a time from the carrier wave switching timing to a second conductive state switching timing being an initial conductive state switching timing after the carrier wave switching timing; when a conductive state of the second bridge circuit is not switched at the carrier wave switching timing, determining that switching of the carrier wave is disabled when the sum of the pre-switching pulse time and the post-switching pulse time is less than a predetermined pulse time sum threshold value; and when the conductive state of the second bridge circuit is switched at the carrier wave switching timing, determining that the switching of the carrier wave is disabled when the pre-switching pulse time or the post-switching pulse time is less than a predetermined pulse time threshold value.

9 Claims, 25 Drawing Sheets

(51) Int. Cl.
  *H02M 7/5387* (2007.01)
  *H02M 1/32* (2007.01)
  *H02P 5/46* (2006.01)
  *H02M 1/00* (2006.01)

(52) U.S. Cl.
  CPC .............. *H02M 1/008* (2021.05); *H02M 1/32* (2013.01); *H02P 5/46* (2013.01)

(56) References Cited

U.S. PATENT DOCUMENTS

| | | | |
|---|---|---|---|
| 9,088,224 B2 * | 7/2015 | Chen | H02M 7/48 |
| 2015/0202967 A1 * | 7/2015 | Syed | B60L 50/40 |
| | | | 320/166 |
| 2016/0318404 A1 * | 11/2016 | Kumazawa | H02M 7/44 |
| 2017/0272006 A1 * | 9/2017 | Uemura | F25D 29/00 |
| 2019/0006966 A1 * | 1/2019 | Valdivia Guerrero | |
| | | | H02M 5/4585 |

* cited by examiner

POWER CONVERSION CONTROL METHOD AND POWER CONVERSION CONTROL DEVICE

TECHNICAL FIELD

The present invention relates to a power conversion control method and a power conversion control device.

BACKGROUND ART

JP2002-300800A discloses a power conversion control device for use in a motor system including a first motor connected to a first three-phase bridge circuit and a second motor connected to a second three-phase bridge circuit.

According to the output states of the motors, the power conversion control device outputs two triangular waves (carrier waves) with a predetermined phase difference therebetween respectively to a drive circuit that drives the first three-phase bridge circuit, and a drive circuit that drives the second three-phase bridge circuit.

For example, when the first motor and the second motor are both in a power running state or a regenerative operation state, the power conversion control device sets the phase difference between the two triangular waves to 90 degrees. On the other hand, when one of the motors is in a power running state and the other motor is in a regenerative operation state, the phase difference is set to 0 degrees.

That is, the power conversion control device of JP2002-300800A switches the phase difference between the two triangular waves according to the operating states of the first motor and the second motor.

SUMMARY OF INVENTION

However, with the power conversion control device of JP2002-300800A, there is a possibility that a surge voltage is momentarily generated between the smoothing capacitor and the bridge circuit in the switching process of the two triangular waves.

The present invention has been made in view of such circumstances, and it is an object of the present invention to provide a power conversion control method and a power conversion control device that make it possible to output carrier waves while suppressing a surge voltage.

According to an aspect of the invention, a power conversion control method is provided, the power conversion control method including generating PWM signals that are output to a first and a second single-phase or multiphase bridge circuit connected in parallel to a DC power supply and respectively connected to inductive loads. The power conversion control method includes selecting one of a first carrier wave for outputting the PWM signal to the first bridge circuit and a second carrier wave with a predetermined phase difference to the first carrier wave, and based on the carrier wave selected, performing switching control of the carrier wave for outputting the PWM signal to the second bridge circuit.

In the switching control of the carrier wave, a pre-switching pulse time is calculated, the pre-switching pulse time being a time from a first conductive state switching timing being a conductive state switching timing of the second bridge circuit immediately before a predetermined carrier wave switching timing, to the carrier wave switching timing. In the switching control of the carrier wave, a post-switching pulse time is calculated, the post-switching pulse time being a time from the carrier wave switching timing to a second conductive state switching timing being an initial conductive state switching timing after the carrier wave switching timing.

Further, when a conductive state of the second bridge circuit is not switched at the carrier wave switching timing, it is determined that switching of the carrier wave is disabled when a sum of the pre-switching pulse time and the post-switching pulse time is less than a predetermined pulse time sum threshold value. When the conductive state of the second bridge circuit is switched at the carrier wave switching timing, it is determined that the switching of the carrier wave is disabled when the pre-switching pulse time or the post-switching pulse time is less than a predetermined pulse time threshold value.

According to another aspect of the invention, a power conversion control device is also provided, the power conversion control device including a first and a second single-phase or multiphase bridge circuit connected in parallel to a DC power supply and respectively connected to inductive loads; and a control device configured to generate PWM signals that are output to the first bridge circuit and the second bridge circuit.

The control device includes a first carrier wave generator configured to generate a first carrier wave for outputting the PWM signal to the first bridge circuit, a second carrier wave generator configured to generate a second carrier wave with a predetermined phase difference to the first carrier wave, and a carrier wave switching unit configured to select one of the first carrier wave and the second carrier wave, and based on the carrier wave selected, perform switching control of the carrier wave for outputting the PWM signal to the second bridge circuit.

Further, the carrier wave switching unit includes a pre-switching pulse time calculation unit configured to calculate a pre-switching pulse time being a time from a first conductive state switching timing being a conductive state switching timing of the second bridge circuit immediately before a predetermined carrier wave switching timing, to the carrier wave switching timing, and a post-switching pulse time calculation unit configured to calculate a post-switching pulse time being a time from the carrier wave switching timing to a second conductive state switching timing being an initial conductive state switching timing after the carrier wave switching timing.

The carrier wave switching unit determines that switching of the carrier wave is disabled when a sum of the pre-switching pulse time and the post-switching pulse time is less than a predetermined pulse time sum threshold value, when a conductive state of the second bridge circuit is not switched at the carrier wave switching timing. The carrier wave switching unit also determines that the switching of the carrier wave is disabled when the pre-switching pulse time or the post-switching pulse time is less than a predetermined pulse time threshold value, when the conductive state of the second bridge circuit is switched at the carrier wave switching timing.

DESCRIPTION OF EMBODIMENTS

First Embodiment

A first embodiment of the present invention will be described below with reference to FIGS. 1 to 10.

Figure 1:
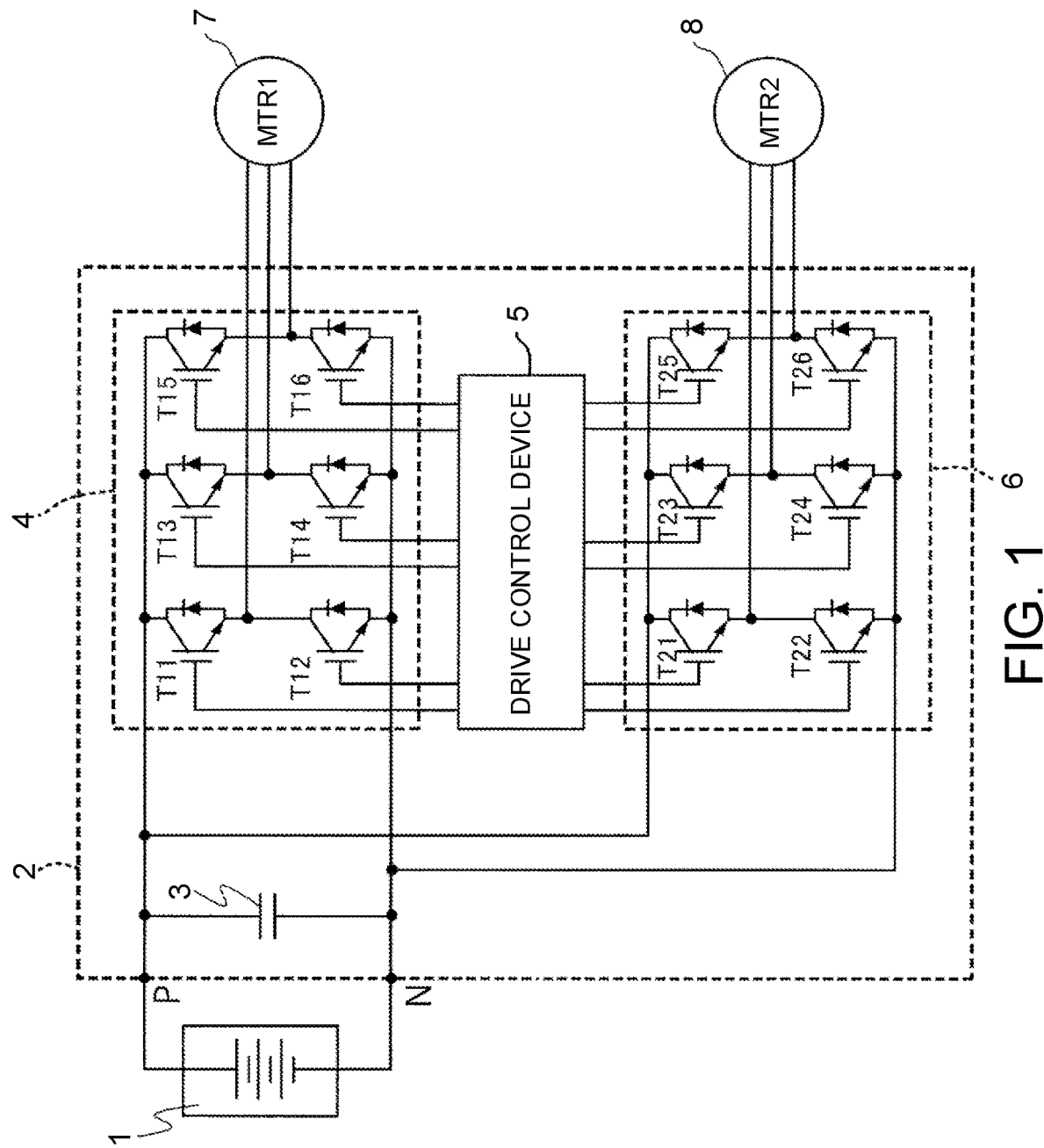
FIG. 1 is a diagram for explaining the configuration of a power conversion control device according to an embodiment of the present invention.

FIG. 1 is a diagram for explaining the configuration of a power conversion control device 2 according to the embodiment of the present invention. The power conversion control device 2 is a device that converts DC power taken out of a battery 1, storing the power, to AC power and supplies the AC power to a first motor 7 and a second motor 8 as inductive loads.

As illustrated in FIG. 1, the power conversion control device 2 includes a smoothing capacitor 3 connected to the battery 1, a first bridge circuit 4, a second bridge circuit 6, and a drive control device 5 that controls the drive of the first bridge circuit 4 and the second bridge circuit 6. DC ends of the first bridge circuit 4 and the second bridge circuit 6 are connected in parallel to the battery 1. AC ends of the first bridge circuit 4 and the second bridge circuit 6 are respectively connected to the first motor 7 and the second motor 8.

The first bridge circuit 4 is configured as a three-phase bridge circuit in this embodiment. The first bridge circuit 4 includes semiconductor switching elements T11 to T16 (e.g. IGBTs) serving as upper arms and lower arms of three phases. The on/off of the semiconductor switching elements T11 to T16 is controlled by the drive control device 5 so that the first bridge circuit 4 converts DC voltage, output from the battery 1, to AC voltage and outputs the AC voltage to the first motor 7. Further, by the control of the on/off of the semiconductor switching elements T11 to T16 by the drive control device 5, the first bridge circuit 4 converts AC voltage, generated by the first motor 7 being driven, to DC voltage so as to charge the battery 1.

The second bridge circuit 6 is configured as a three-phase bridge circuit in this embodiment. The second bridge circuit 6 includes semiconductor switching elements T21 to T26 (e.g. IGBTs) serving as upper arms and lower arms of three phases. The on/off of the semiconductor switching elements T21 to T26 is controlled by the drive control device 5 so that the second bridge circuit 6 converts DC voltage, output from the battery 1, to AC voltage and outputs the AC voltage to the second motor 8. Further, by the control of the on/off of the semiconductor switching elements T11 to T16 by the drive control device 5, the second bridge circuit 6 converts AC voltage, generated by the second motor 8 being driven, to DC voltage so as to charge the battery 1.

Next, the configuration of the drive control device 5 will be described. The drive control device 5 is configured as an electronic control unit formed by a microcomputer including various calculation/control devices such as a CPU, various storage devices such as a ROM and a RAM, an input/output interface, and so on. The drive control device 5 is programmed to perform processes in a power conversion control method in each of later-described embodiments.

Figure 2:
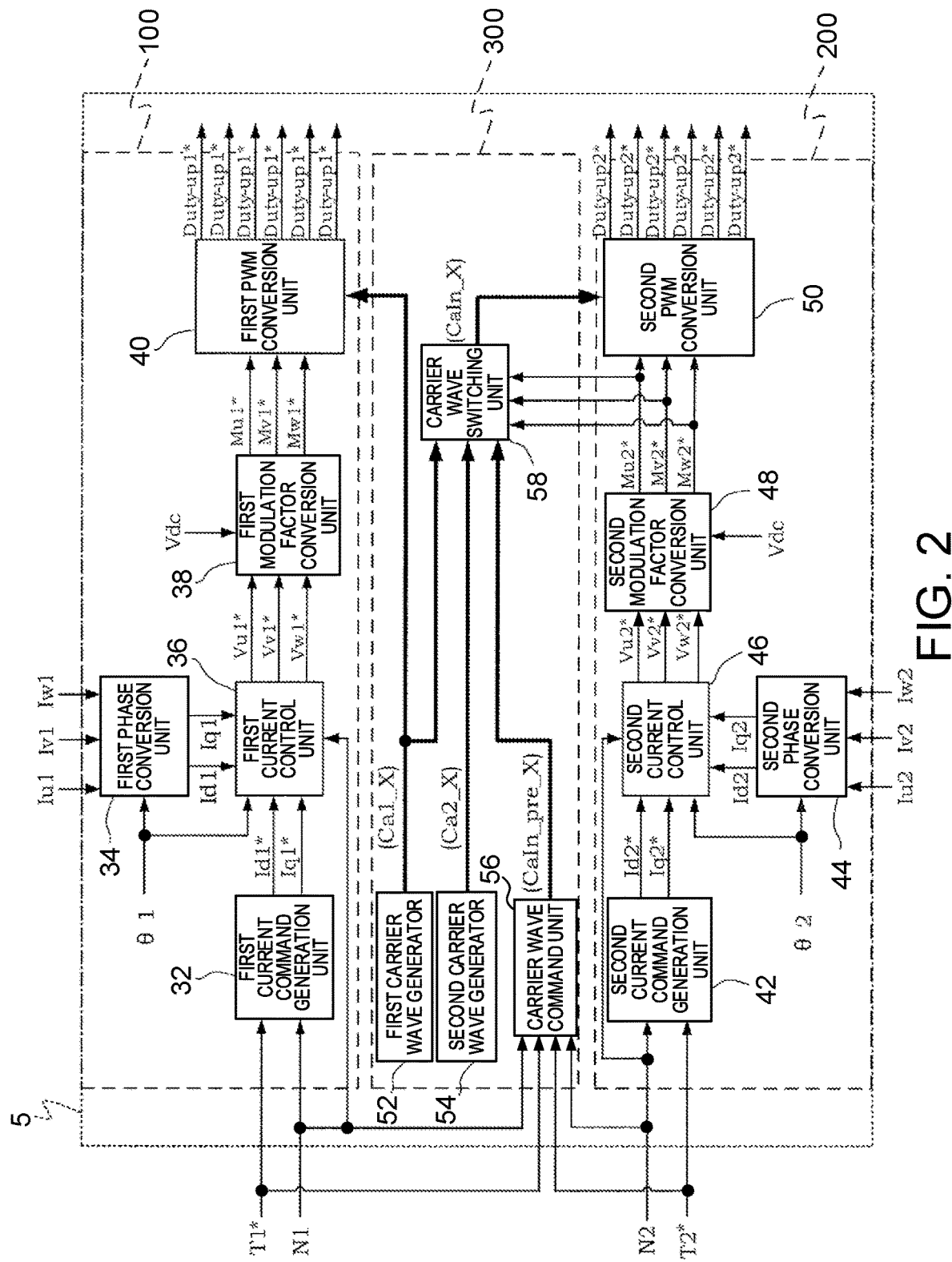
FIG. 2 is a block diagram for explaining the configuration of a drive control device.

FIG. 2 is a block diagram for explaining the function of the drive control device 5.

As illustrated, the drive control device 5 includes a first motor control block 100 that realizes the function of controlling the first motor 7, a second motor control block 200 that realizes the function of controlling the second motor 8, and a carrier wave switching control block 300 that controls the switching of a carrier wave.

The first motor control block 100 includes a first current command generation unit 32, a first phase conversion unit 34, a first current control unit 36, a first modulation factor conversion unit 38, and a first PWM conversion unit 40. The second motor control block 200 includes a second current command generation unit 42, a second phase conversion unit 44, a second current control unit 46, a second modulation factor conversion unit 48, and a second PWM conversion unit 50. The carrier wave switching control block 300 includes a first carrier wave generator 52, a second carrier wave generator 54, a carrier wave command unit 56, and a carrier wave switching unit 58.

First, the respective configurations of the first motor control block 100 will be described. The first current command generation unit 32 calculates first dq-axis current command values (Id1*, Iq1*) based on a torque command value T1* for the first motor 7 and a rotation speed N1 of the first motor 7. Then, the first current command generation unit 32 outputs the calculated first dq-axis current command values (Id1*, Iq1*) to the first current control unit 36.

The first phase conversion unit 34 acquires first three-phase current values (Iu1, Iv1, Iw1) output by the first bridge circuit 4, a rotation angle θ1 of the first motor 7, the rotation speed N1, and the first dq-axis current command values (Id1*, Iq1*) calculated by the first current command generation unit 32. Then, using the rotation angle θ1, the first phase conversion unit 34 converts the first three-phase current values (Iu1, Iv1, Iw1) to first dq-axis currents (Id1, Iq1) (three-phase/two-phase conversion). Then, the first phase conversion unit 34 outputs the first dq-axis currents (Id1, Iq1) to the first current control unit 36.

The first current control unit 36 acquires the rotation speed N1, the rotation angle θ1, the first dq-axis current command values (Id1*, Iq1*) from the first current command generation unit 32, and the first dq-axis currents (Id1, Iq1) from the first phase conversion unit 34. Then, based on the rotation speed N1 and the rotation angle θ1, the first current control unit 36 calculates first phase voltage command values (Vu1*, Vv1*, Vw1*) so that the first dq-axis currents (Id1, Iq1) approach the first dq-axis current command values (Id1*, Iq1*). Then, the first current control unit 36 outputs the calculated first phase voltage command values (Vu1*, Vv1*, Vw1*) to the first modulation factor conversion unit 38.

The first modulation factor conversion unit 38 acquires a high voltage Vdc corresponding to the voltage of the battery 1, and the first phase voltage command values (Vu1*, Vy1*, Vw1*) from the first current control unit 36. Then, the first modulation factor conversion unit 38 calculates first modulation factors (Mu1*, My1*, Mw1*) based on the high voltage Vdc and the first phase voltage command values (Vu1*, Vy1*, Vw1*).

More specifically, the first modulation factor conversion unit 38 calculates the first modulation factors (Mu1*, My1*, Mw1*) corresponding to the magnitudes of the components of the first phase voltage command values (Vu1*, Vv1*, Vw1*) relative to the magnitude of the DC high voltage Vdc. Then, the first modulation factor conversion unit 38 outputs the first modulation factors (Mu1*, My1*, Mw1*) to the first PWM conversion unit 40.

The first PWM conversion unit 40 acquires the first modulation factors (Mu1*, My1*, Mw1*) from the first modulation factor conversion unit 38 and later-described first carrier waves (Ca1_u, Ca1_v, Ca1_w) from the first carrier wave generator 52. Then, based on the first modulation factors (Mu1*, Mv1*, Mw1*) and the first carrier waves (Ca1_u, Ca1_v, Ca1_w), the first PWM conversion unit 40 generates PWM signals (Duty-up1, Duty-un1, Duty-vp1, Duty-vn1, Duty-wp1, Duty-wn1) for the respective semiconductor switching elements T11 to T16.

More specifically, the first PWM conversion unit 40 detects differences between the first carrier waves (Ca1_u, Ca1_v, Ca1_w) and the first modulation factors (Mu1*, My1*, Mw1*) by non-illustrated comparators and generates the PWM signals (Duty-up1, Duty-un1, Duty-vp1, Duty-vn1, Duty-wp1, Duty-wn1) so as to switch ON-pulses and OFF-pulses of the respective phases according to the detected differences.

Then, the first PWM conversion unit 40 transmits the generated PWM signals (Duty-up1, Duty-un1, Duty-vp1, Duty-vn1, Duty-wp1, Duty-wn1) to the respective semiconductor switching elements T11 to T16. Consequently, the respective semiconductor switching elements T11 to T16 are turned on/off according to the PWM signals (Duty-up1, Duty-un1, Duty-vp1, Duty-vn1, Duty-wp1, Duty-wn1).

The functions of the second current command generation unit 42, the second phase conversion unit 44, and the second current control unit 46 in the second motor control block 200 that controls the second motor 8 are approximately the same as the functions of the first current command generation unit 32, the first phase conversion unit 34, and the first current control unit 36 in the first motor control block 100.

On the other hand, the second modulation factor conversion unit 48 outputs second modulation factors (Mu2*, Mv2*, Mw2*) calculated from second phase voltage command values (Vu2*, Vv2*, Vw2*) to the second PWM conversion unit 50 and, in addition, to the carrier wave switching unit 58.

Then, based on the second modulation factors (Mu2*, Mv2*, Mw2*) and later-described command carrier waves (CaIn_u, CaIn_v, CaIn_w) from the carrier wave switching unit 58, the second PWM conversion unit 50 generates PWM signals (Duty-up2, Duty-un2, Duty-vp2, Duty-vn2, Duty-wp2, Duty-wn2) for the respective semiconductor switching elements T21 to T26.

Next, the details of the carrier wave switching control block 300 will be described.

The first carrier wave generator 52 of the carrier wave switching control block 300 is formed by a triangular wave generator circuit that outputs pulsed triangular waves of a predetermined period (predetermined frequency) as the first carrier waves (Ca1_u, Ca1_v, Ca1_w). The first carrier wave generator 52 outputs the first carrier waves (Ca1_u, Ca1_v, Ca1_w) to the first PWM conversion unit 40 and the carrier wave switching unit 58.

On the other hand, the second carrier wave generator 54 is formed by a triangular wave generator circuit that outputs, as second carrier waves (Ca2_u, Ca2_v, Ca2_w), pulsed triangular waves with a phase difference φ (90°) with respect to the respective components of the first carrier waves (Ca1_u, Ca1_v, Ca1_w). The second carrier wave generator 54 outputs the second carrier waves (Ca2_u, Ca2_v, Ca2_w) to the carrier wave switching unit 58. Next, the carrier wave command unit 56 will be described.

Hereinafter, for the simplicity of description, the amounts including the components corresponding to the respective phases, such as the first carrier waves (Ca1_u, Ca1_v, Ca1_w), the second carrier waves (Ca2_u, Ca2_v, Ca2_w), the second modulation factors (Mu2*, Mv2*, Mw2*), and the command carrier waves (CaIn_u, CaIn_v, CaIn_w), will be abbreviated by using uppercase letter "X" as a suffix, such as a first carrier wave (Ca1_X), a second carrier wave (Ca2_X), a second modulation factor (MX2*), and a command carrier wave (CaIn_X). When representing one of the phases, it is given by using lowercase letter "x" as a suffix, such as "a first carrier wave Ca1_x".

Next, the carrier wave command unit 56 will be described.

Figure 3:
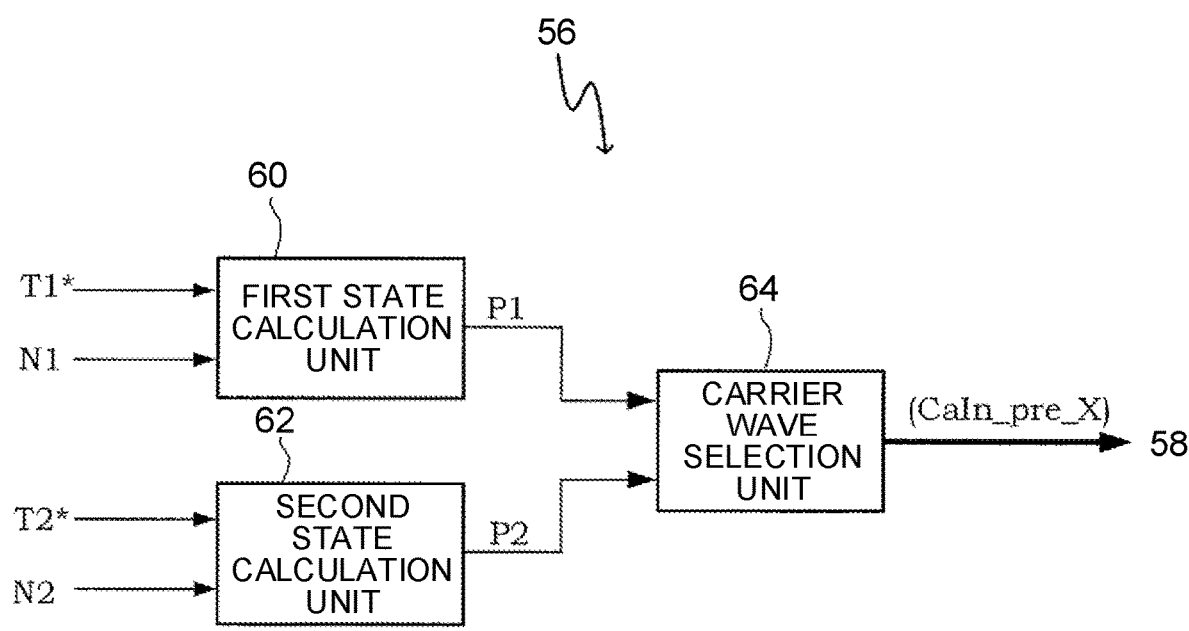
FIG. 3 is a block diagram for explaining the function of a carrier wave command unit of a first embodiment.

FIG. 3 is a block diagram for explaining the details of the function of the carrier wave command unit 56. As illustrated, the carrier wave command unit 56 includes a first state calculation unit 60, a second state calculation unit 62, and a carrier wave selection unit 64.

The first state calculation unit 60 acquires the torque command T1* and the rotation speed N1 of the first motor 7, and a torque command T2* and a rotation speed N2 of the second motor 8. Then, based on the torque command T1* and the rotation speed N1, the first state calculation unit 60 calculates a first motor output P1 being an output of the first motor 7.

More specifically, the first state calculation unit 60 calculates the first motor output P1 [W] from the following formula (1) based on the torque command T1* [Nm] and the rotation speed N1 [rpm].

[Math. 1]

$$P1 = \frac{N1}{60} \times 2 \times \pi \times T1^* \quad (1)$$

Then, the first state calculation unit 60 outputs the calculated first motor output P1 to the carrier wave selection unit 64.

On the other hand, the second state calculation unit 62 acquires a torque command T2* and a rotation speed N2 of the second motor 8. Then, based on the torque command T2* and the rotation speed N2, the second state calculation unit 62 calculates a second motor output P2 being an output of the second motor 8.

More specifically, the second state calculation unit 62 calculates the second motor output P2 [W] from the following formula (2) based on the torque command T2* [Nm] and the rotation speed N2 [rpm].

[Math. 2]

$$P2 = \frac{N2}{60} \times 2 \times \pi \times T2^* \quad (2)$$

Then, the second state calculation unit 62 outputs the calculated second motor output P2 to the carrier wave selection unit 64.

The carrier wave selection unit 64 acquires the first motor output P1 from the first state calculation unit 60 and the second motor output P2 from the second state calculation unit 62. Then, according to the first motor output P1 and the second motor output P2, the carrier wave selection unit 64 selects one of the first carrier wave (Ca1_X) and the second carrier wave (Ca2_X).

More specifically, the carrier wave selection unit 64 selects the first carrier wave (Ca1_X) or the second carrier wave (Ca2_X) in the manner shown in Table 1 below.

TABLE 1

|  | P1 > 0 | P1 < 0 |
|---|---|---|
| P2 > 0 | Second Carrier Wave | First Carrier Wave |
| P2 < 0 | First Carrier Wave | Second Carrier Wave |

As seen from Table 1, the carrier wave selection unit 64 of this embodiment selects the first carrier wave (Ca1_X) when one of the first motor output P1 and the second motor output P2 is positive and the other is negative (when the signs are different), and selects the second carrier wave (Ca2_X) when the signs of the first motor output P1 and the second motor output P2 are the same.

That is, the carrier wave selection unit 64 selects the first carrier wave (Ca1_X) when one of the first motor 7 and the second motor 8 is in the power running and the other is in the regenerative operation, and selects the second carrier wave (Ca2_X) when the first motor 7 and the second motor 8 are both in the power running or in the regenerative operation.

Then, the carrier wave selection unit 64 outputs the selected carrier wave (hereinafter also referred to as "the selected carrier wave (CaIn_pre_X)") to the carrier wave switching unit 58.

Referring back to FIG. 2, the carrier wave switching unit 58 acquires the first carrier wave (Ca1_X) from the first carrier wave generator 52, the second carrier wave (Ca2_X) from the second carrier wave generator 54, the selected carrier wave (CaIn_pre_X) from the carrier wave command unit 56, and the second modulation factor (MX2*) from the second modulation factor conversion unit 48.

Then, based on the first carrier wave (Ca1_X), the second carrier wave (Ca2_X), the selected carrier wave (CaIn_pre_X), and the second modulation factor (MX2*), the carrier wave switching unit 58 sets the command carrier wave (CaIn_X) that is used for generating the PWM signals (Duty-up2, Duty-un2, Duty-vp2, Duty-vn2, Duty-wp2, Duty-wn2) in the second PWM conversion unit 50.

Figure 4:
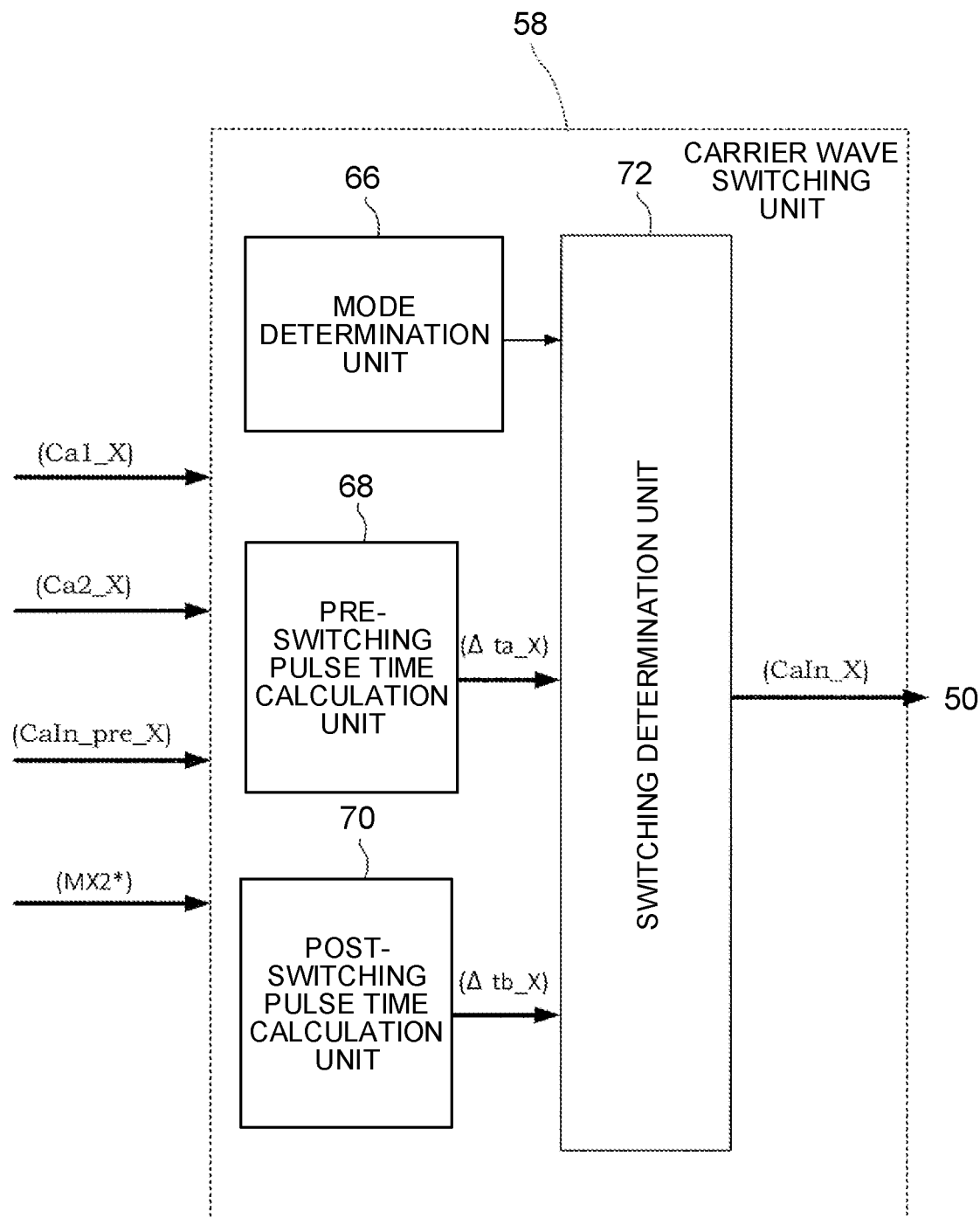
FIG. 4 is a block diagram for explaining the function of a carrier wave switching unit.

FIG. 4 is a block diagram for explaining the details of the function of the carrier wave switching unit 58. As illustrated, the carrier wave switching unit 58 includes a mode determination unit 66, a pre-switching pulse time calculation unit 68, a post-switching pulse time calculation unit 70, and a switching determination unit 72.

The mode determination unit 66 extracts information of the carrier wave, currently used, from the command carrier waves (CaIn_X) stored in a memory or the like. Then, based on the information of the carrier wave currently used, the mode determination unit 66 determines one of a first switching determination mode to a fourth switching determination mode each being the mode for determining whether or not the carrier wave switching is enabled.

Figure 5:
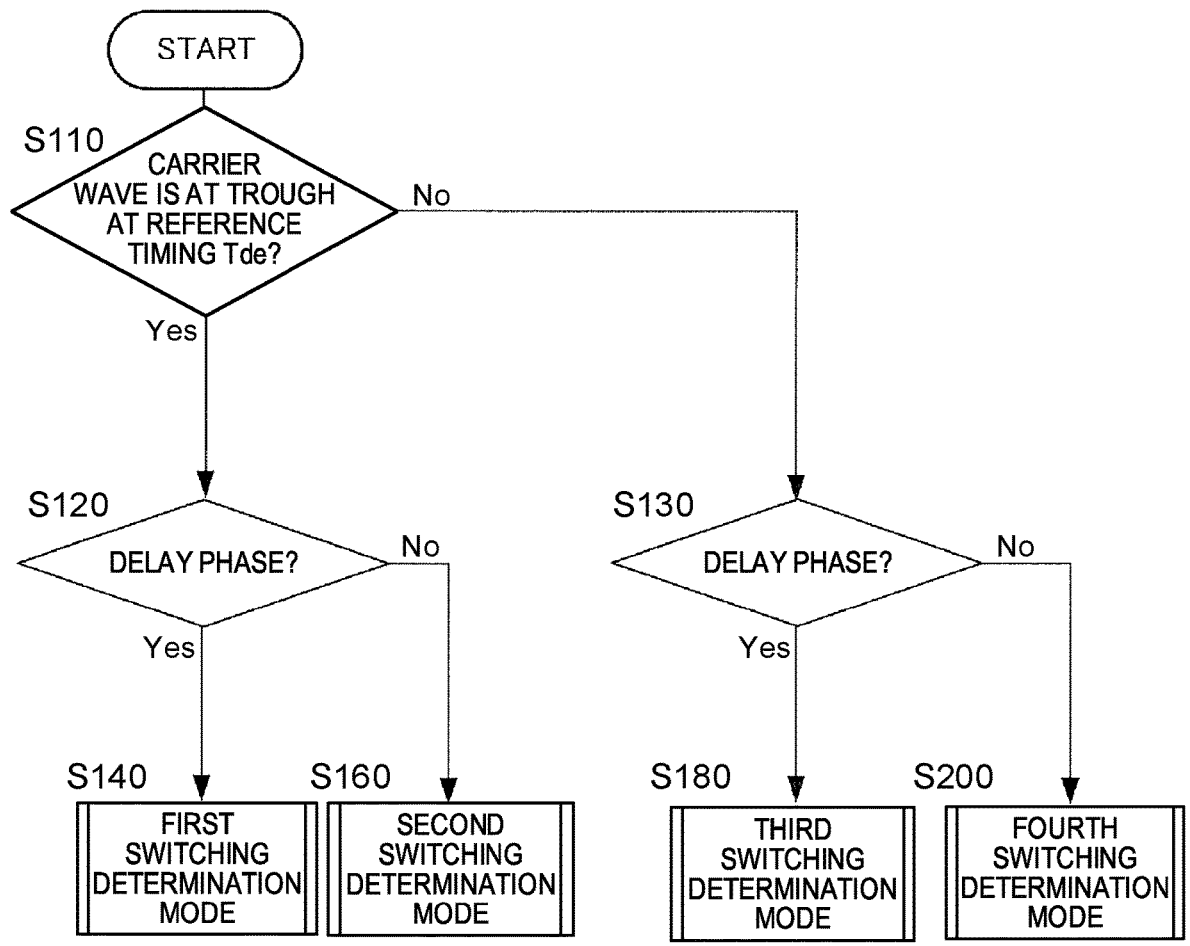
FIG. 5 is a flowchart for explaining the flow of determination for each of switching determination modes.

FIG. 5 is a flowchart for explaining the flow of determination for each of the switching determination modes. First, the mode determination unit 66 sets a reference timing Tde serving as a reference for performing a calculation as to whether or not the carrier wave switching is enabled, to the timing at which the carrier wave currently used is at a peak or a trough.

Then, when the use carrier wave is at the trough at the reference timing Tde (Yes at step S110), the mode determination unit 66 proceeds to a determination at step S120. On the other hand, when the use carrier wave is at the peak at the reference timing Tde (No at step S110), the mode determination unit 66 proceeds to a determination at step S130.

Further, at step S120, the mode determination unit 66 selects the first switching determination mode (step S140) when delaying the phase of the post-switching carrier wave with respect to the phase of the pre-switching carrier wave in the carrier wave switching, and selects the second switching determination mode (step S160) when advancing the phase.

Likewise, at step S130, the mode determination unit 66 selects the third switching determination mode (step S180) when delaying the phase before and after the switching, and selects the fourth switching determination mode (step S200) when advancing the phase.

Further, the mode determination unit 66 sets a virtual switching timing Tch as the virtual timing for performing the carrier wave switching. In particular, in this embodiment, the virtual switching timing Tch is set to the timing at which the values (0 to 1) of the carrier waves before and after the switching agree with each other after the reference timing Tde. That is, the virtual switching timing Tch depends on the phase difference φ. Then, the mode determination unit 66 outputs the selected switching determination mode to the switching determination unit 72.

Referring back to FIG. 4, the pre-switching pulse time calculation unit 68 calculates a pre-switching pulse time (Δta_X). Herein, the pre-switching pulse time (Δta_X) of this embodiment is defined as the time from a first pulse change timing (Tsw1_X) being the initial timing at which the value of the carrier wave agrees with the second modulation factor (MX2*) after the reference timing Tde, to the virtual switching timing Tch.

On the other hand, the post-switching pulse time calculation unit 70 calculates a post-switching pulse time Δtb_x. Herein, the post-switching pulse time (Δtb_X) of this embodiment is defined as the time from the virtual switching timing Tch to the initial timing (hereinafter also referred to as a "second pulse change timing (Tsw2_X)") at which the value of the command carrier wave CaIn_x of X-phase agrees with the second modulation factor Mx2* after the virtual switching timing Tch.

Then, the switching determination unit 72 determines from the pre-switching pulse time (Ata X) and the post-switching pulse time (Δtb_X) whether or not the carrier wave switching is enabled. Further, when the switching determination unit 72 determines that the switching is enabled, the switching determination unit 72 outputs the currently used carrier wave as the command carrier wave (CaIn_X) to the second PWM conversion unit 50. On the other hand, when the switching determination unit 72 determines that the switching is enabled, the switching determination unit 72 outputs the carrier wave after the switching as the command carrier wave (CaIn_X) to the second PWM conversion unit 50.

The details of the respective switching determination modes performed by the carrier wave switching unit 58 configured as described above will be described.

Figure 6A:
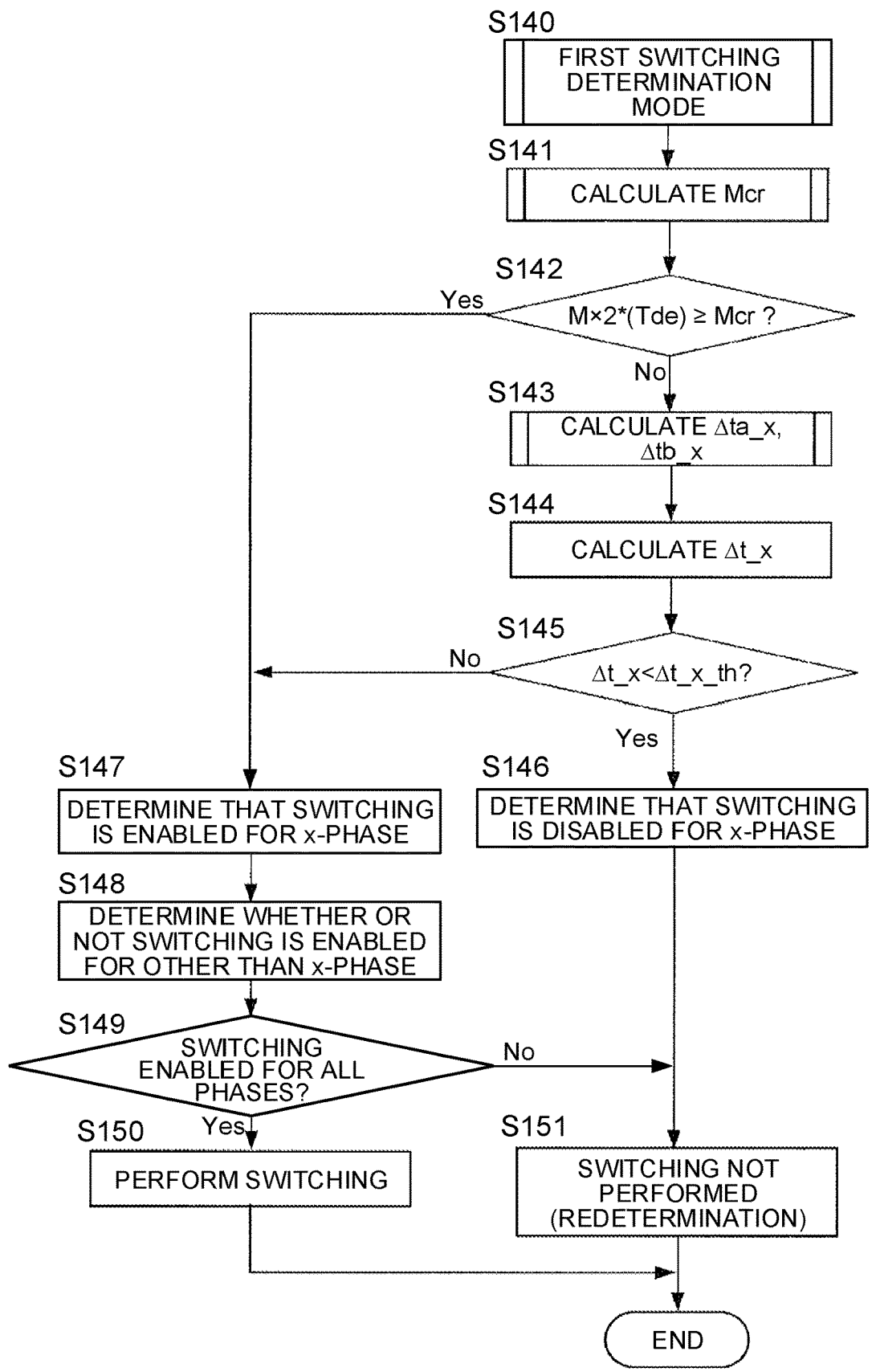
FIG. 6A is a flowchart for explaining the flow of a first switching determination mode of the first embodiment.
Figure 6B:
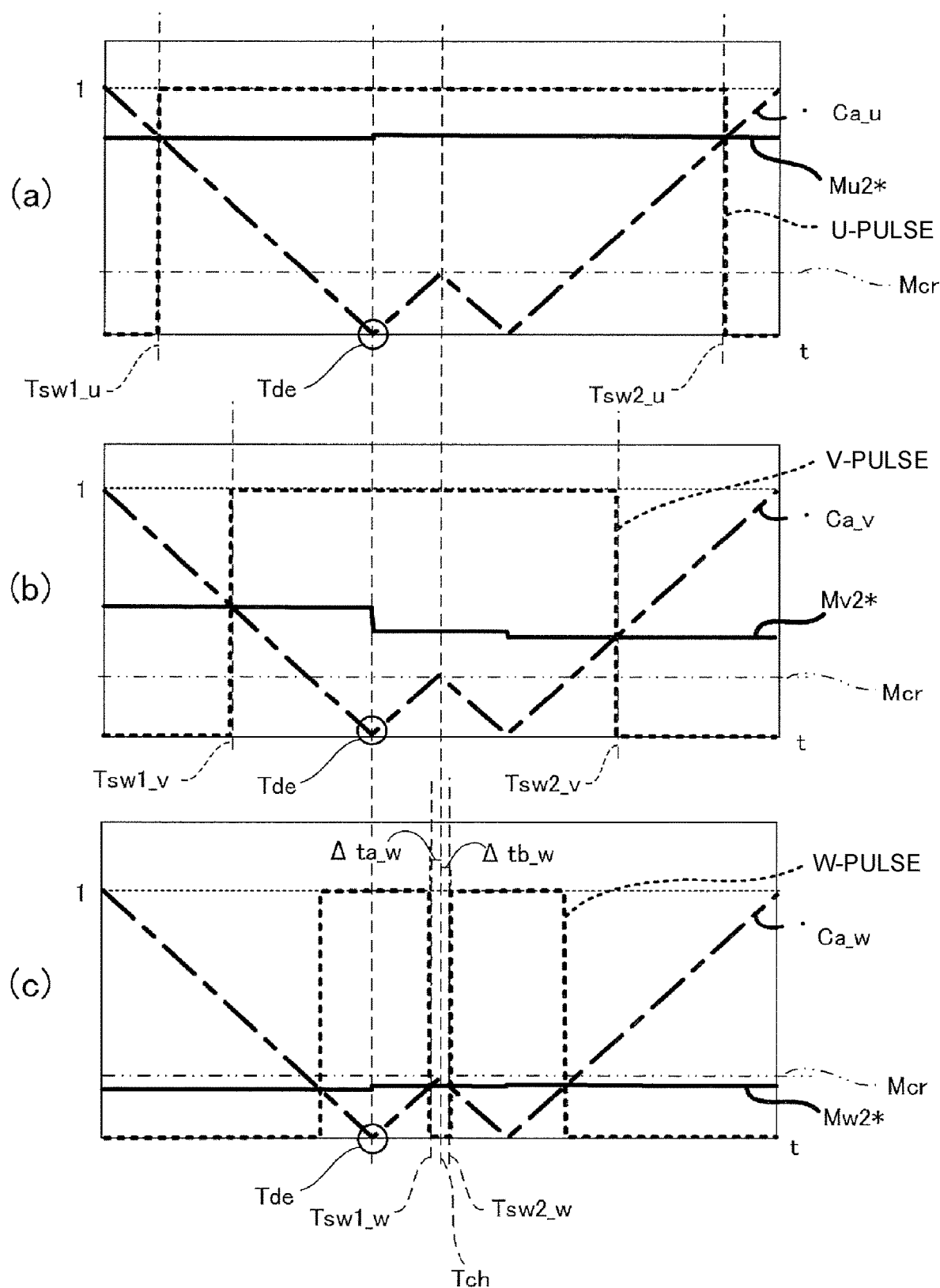
FIG. 6B is a timing chart for explaining an example of carrier wave switching in the first switching determination mode of the first embodiment.

FIG. 6A is a flowchart for explaining the flow of the first switching determination mode. That is, the first switching determination mode described in FIG. 6A is the calculation process for determining the command carrier wave (CaIn_X) when delaying the phase of the carrier wave before and after the switching in the case where the transition of the use carrier wave at the reference timing Tde is at the trough. FIG. 6B is a timing chart for explaining an example of the carrier wave switching in the first switching determination mode.

At step S141, the carrier wave switching unit 58 calculates a cross point value Mcr from the phase difference φ between the first carrier wave (Ca1_X) and the second carrier wave (Ca2_X). The cross point value Mcr is the value of the carrier wave at the virtual switching timing Tch.

Specifically, the cross point value Mcr in the first switching determination mode is calculated based on the following formula (3).

[Math. 3]

$$Mcr = 1 \times \frac{\Phi}{360} \quad (3)$$

At step S142, the carrier wave switching unit 58 determines whether or not the second modulation factor Mx2* (Tde) at the reference timing Tde is equal to or larger than the cross point value Mcr. Then, when the carrier wave switching unit 58 determines that the second modulation factor Mx2*(Tde) is not equal to or larger than the cross point value Mcr, the carrier wave switching unit 58 performs the processes of step S143 and subsequent steps relating to a determination as to whether or not the switching of the carrier wave of x-phase is enabled.

On the other hand, when the carrier wave switching unit 58 determines that the second modulation factor Mx2*(Tde) is equal to or larger than the cross point value Mcr, the carrier wave switching unit 58 performs the processes of step S147 and subsequent steps in which it is determined that the switching of the carrier wave of x-phase is enabled.

That is, when the second modulation factor Mx2*(Tde) is equal to or larger than the cross point value Mcr, the time until the second pulse change timing Tsw2_x is relatively long (see FIG. 6B (a), (b)). That is, the pulse time (ON-pulse time) from the first pulse change timing Tsw1_x to the second pulse change timing Tsw2_x via the virtual switching timing Tch becomes long.

Therefore, when the second modulation factor Mx2* (Tde) is equal to or larger than the cross point value Mcr, a shift is made to the processes of step S147 and subsequent steps that basically assume the switching of the carrier wave of x-phase to be enabled.

On the other hand, when the second modulation factor Mx2*(Tde) is not equal to or larger than the cross point value Mcr, the pulse time (OFF-pulse time) from the first pulse change timing Tsw1_x to the second pulse change timing Tsw2_x via the virtual switching timing Tch becomes relatively short (see FIG. 6B (c)).

If the semiconductor elements of the second bridge circuit 6 are on/off controlled according to the control logic of the second PWM conversion unit 50 in response to this short pulse time, there is concern about the occurrence of a surge voltage.

Therefore, in the first switching determination mode of this embodiment, when the second modulation factor Mx2* (Tde) is not equal to or larger than the cross point value Mcr, the processes of step S143 and subsequent steps are performed as a further determination process as to whether or not the carrier wave switching is enabled in terms of suppressing the surge voltage.

First, the details of step S143 and subsequent steps when the second modulation factor Mx2*(Tde) is determined not to be equal to or larger than the cross point value Mcr will be described.

At step S143, the pre-switching pulse time calculation unit 68 and the post-switching pulse time calculation unit 70 of the carrier wave switching unit 58 respectively calculate a pre-switching pulse time Δta_x and a post-switching pulse time Δtb_x described above.

Specifically, the pre-switching pulse time calculation unit 68 calculates the pre-switching pulse time Δta_x based on the following formula (4).

[Math. 4]

$$\Delta ta\_x = (Mcr - Mx2*(Tde)) \times \frac{1}{2fc} \quad (4)$$

fc in the formula (4) represents the frequency of the carrier wave and its unit is, for example, [kHz]. That is, the pre-switching pulse time Δta_x corresponds to the time from the first pulse change timing Tsw1_x to the virtual switching timing Tch (see FIG. 6B (c)).

On the other hand, the post-switching pulse time calculation unit 70 calculates the post-switching pulse time Δtb_x based on the following formula (5).

[Math. 5]

$$\Delta tb\_x = (Mcr - Mx2 * (Tde)) \times \frac{1}{2fc} \quad (5)$$

The post-switching pulse time Δtb_x of the formula (5) corresponds to the time from the virtual switching timing Tch to the second pulse change timing Tsw2_x (see FIG. 6B (c)).

Then, at step S144, the carrier wave switching unit 58 calculates a switching time sum Δt_x. Specifically, the carrier wave switching unit 58 calculates the switching time sum Δt_x based on the following formula (6).

[Math. 6]

$$\Delta t\_x = \Delta ta\_x + \Delta tb\_x \quad (6)$$

That is, the switching time sum Δt_x corresponds to a pulse time from the first pulse change timing Tsw1_x to the second pulse change timing Tsw2_x.

Then, at step S145, the carrier wave switching unit 58 determines whether or not the switching time sum Δt_x is less than a predetermined pulse time threshold value Δt_x_th. When the carrier wave switching unit 58 determines that the switching time sum Δt_x is less than the threshold time Δt_x_th, the carrier wave switching unit 58 proceeds to step S146 and determines that the switching of the carrier wave of X-phase is disabled.

The threshold time Δt_x_th is determined in terms of whether or not the pulse time from the first pulse change timing Tsw1_x to the second pulse change timing Tsw2_x is short so that there is a possibility of the occurrence of the surge voltage. The specific setting manner of the threshold time Δt_x_th will be described in detail later.

At step S151, the carrier wave switching unit 58 does not perform the carrier wave switching. That is, the switching determination unit 72 of the carrier wave switching unit 58 outputs the currently used carrier wave as the command carrier wave CaIn_X. Further, the carrier wave switching unit 58 performs again a redetermination process for determining whether or not the switching is enabled, at the timing of switching the carrier wave next.

Specifically, the carrier wave switching unit 58 sets the virtual switching timing Tch to the timing at which the use carrier wave is at a peak or a trough next, and performs the processes of FIGS. 5 and 6 again.

On the other hand, when the carrier wave switching unit 58 determines at step S145 that the switching time sum Δt_x is not less than the threshold time Δt_x_th, the carrier wave switching unit 58 proceeds to the process of step S147 and determines that the switching is enabled for the carrier wave of X-phase.

Further, at step S148, the carrier wave switching unit 58 determines whether or not the carrier wave switching is enabled for the phases other than X-phase.

More specifically, the carrier wave switching unit 58 performs the same processes as the processes of steps S141 to S145 also for the phases (e.g. V-phase and W-phase) other than X-phase. For example, when the carrier wave switching unit 58 performs the above-described processes for U-phase and determines that the switching is enabled, the carrier wave switching unit 58 performs the same processes for V-phase and W-phase.

Then, at step S149, the carrier wave switching unit 58 determines whether or not the carrier wave switching is enabled for all the phases (U-phase, V-phase, and W-phase in this embodiment). When the carrier wave switching unit 58 determines that the carrier wave switching is enabled for all the phases, the carrier wave switching unit 58 proceeds to step S150.

At step S150, according to the control logic illustrated in FIGS. 2 and 4, the switching determination unit 72 of the carrier wave switching unit 58 switches the current carrier wave and outputs the switched carrier wave as the command carrier wave (CaIn_X) to the second PWM conversion unit 50.

That is, when the current use carrier wave is the first carrier wave (Ca1_X) (the second carrier wave (Ca2_X)), the switching determination unit 72 outputs the second carrier wave (Ca2_X) (the first carrier wave (Ca1_X)) as the command carrier wave (CaIn_X) to the second PWM conversion unit 50.

By the processes described above, in the first switching determination mode (the case where the phase is delayed before and after the carrier wave switching with the reference timing Tde at which the carrier wave is at the trough), it is possible to suppress the switching of the carrier wave in the situation where the surge voltage can be caused.

Next, the second switching determination mode (the case where the phase is advanced before and after the carrier wave switching with the reference timing Tde at which the carrier wave is at the trough) of step S160 illustrated in FIG. 5 will be described.

Figure 7A:
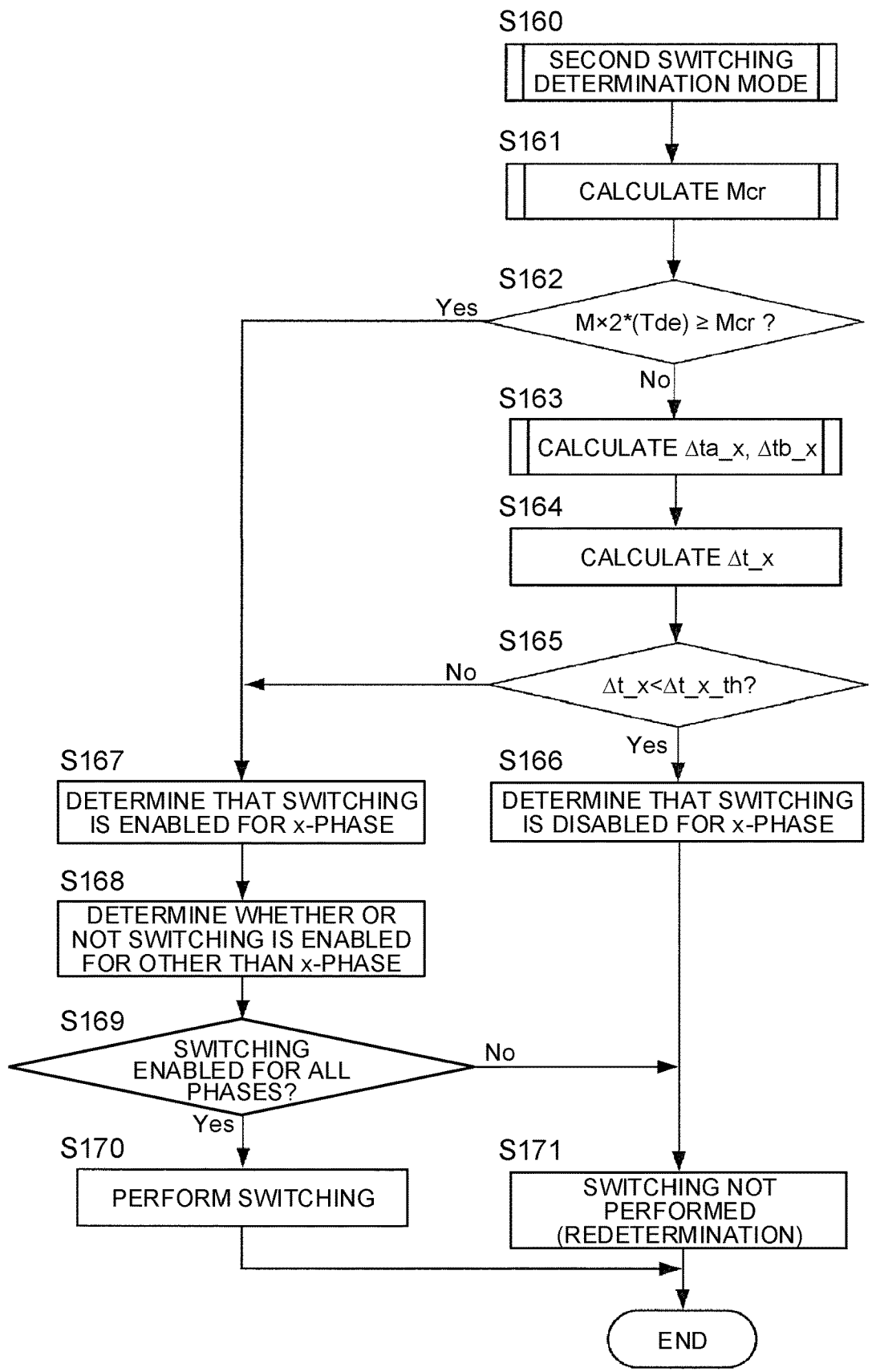
FIG. 7A is a flowchart for explaining the flow of a second switching determination mode of the first embodiment.
Figure 7B:
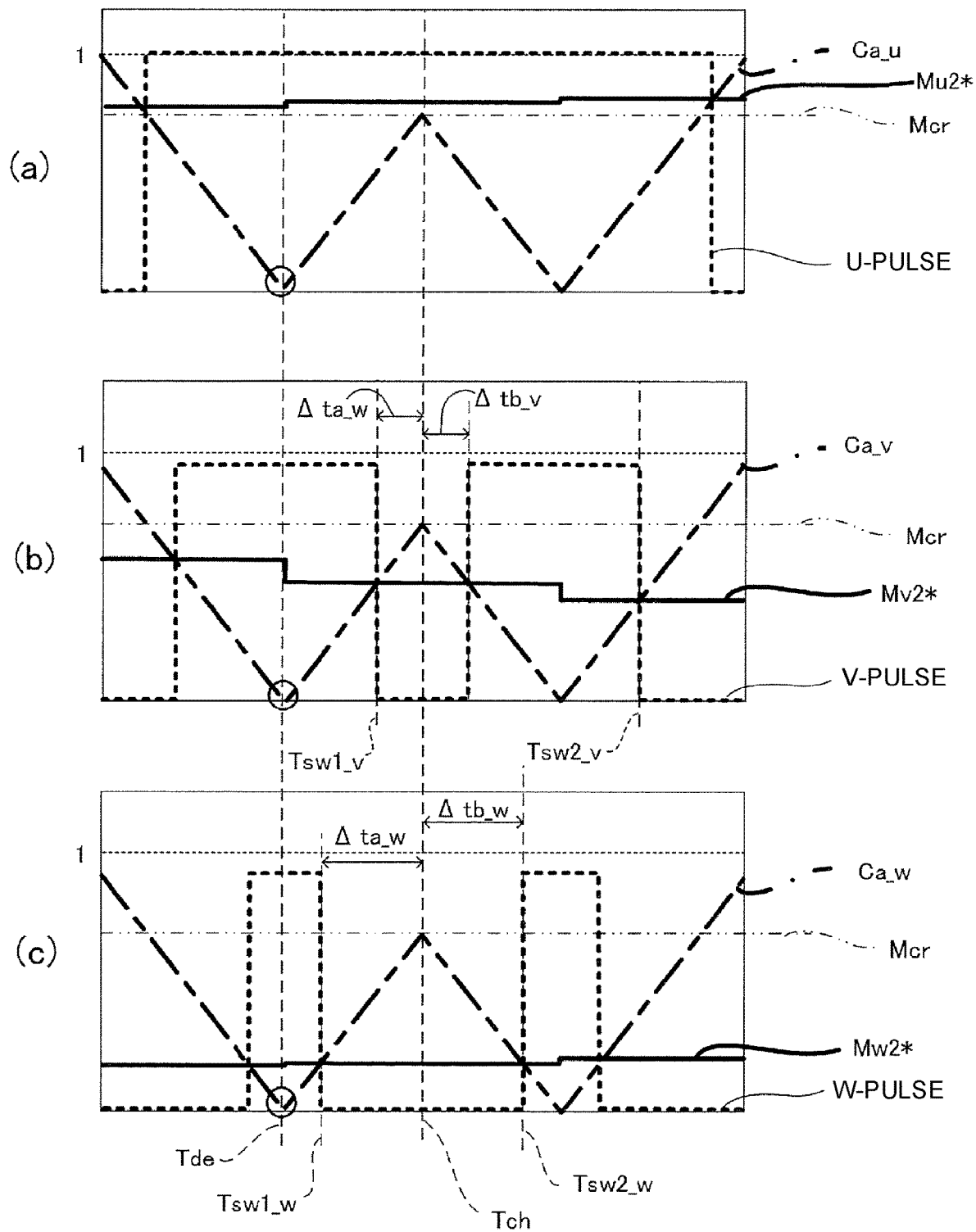
FIG. 7B is a timing chart for explaining an example of carrier wave switching in the second switching determination mode of the first embodiment.

FIG. 7A is a flowchart for explaining the flow of the second switching determination mode. FIG. 7B is a timing chart for explaining an example of the carrier wave switching in the second switching determination mode.

At step S161, the carrier wave switching unit 58 calculates a cross point value Mcr in the second switching determination mode based on the following formula (7) from the phase difference ϕ between the first carrier wave (Ca1_X) and the second carrier wave (Ca2_X).

[Math. 7]

$$Mcr = 1 - 1 \times \frac{\Phi}{360} \quad (7)$$

At step S163 and subsequent steps, the same processes as the processes of step S143 and subsequent steps in FIG. 6A will be performed.

As described above, also in the second switching determination mode, it is possible to suppress the switching of the carrier wave in the situation where the surge voltage can be caused, and to detect an appropriate timing so as to perform the switching of the carrier wave.

Next, the third switching determination mode (the case where the phase is delayed before and after the carrier wave switching with the reference timing Tde at which the carrier wave is at the peak) of step S180 illustrated in FIG. 5 will be described.

Figure 8A:
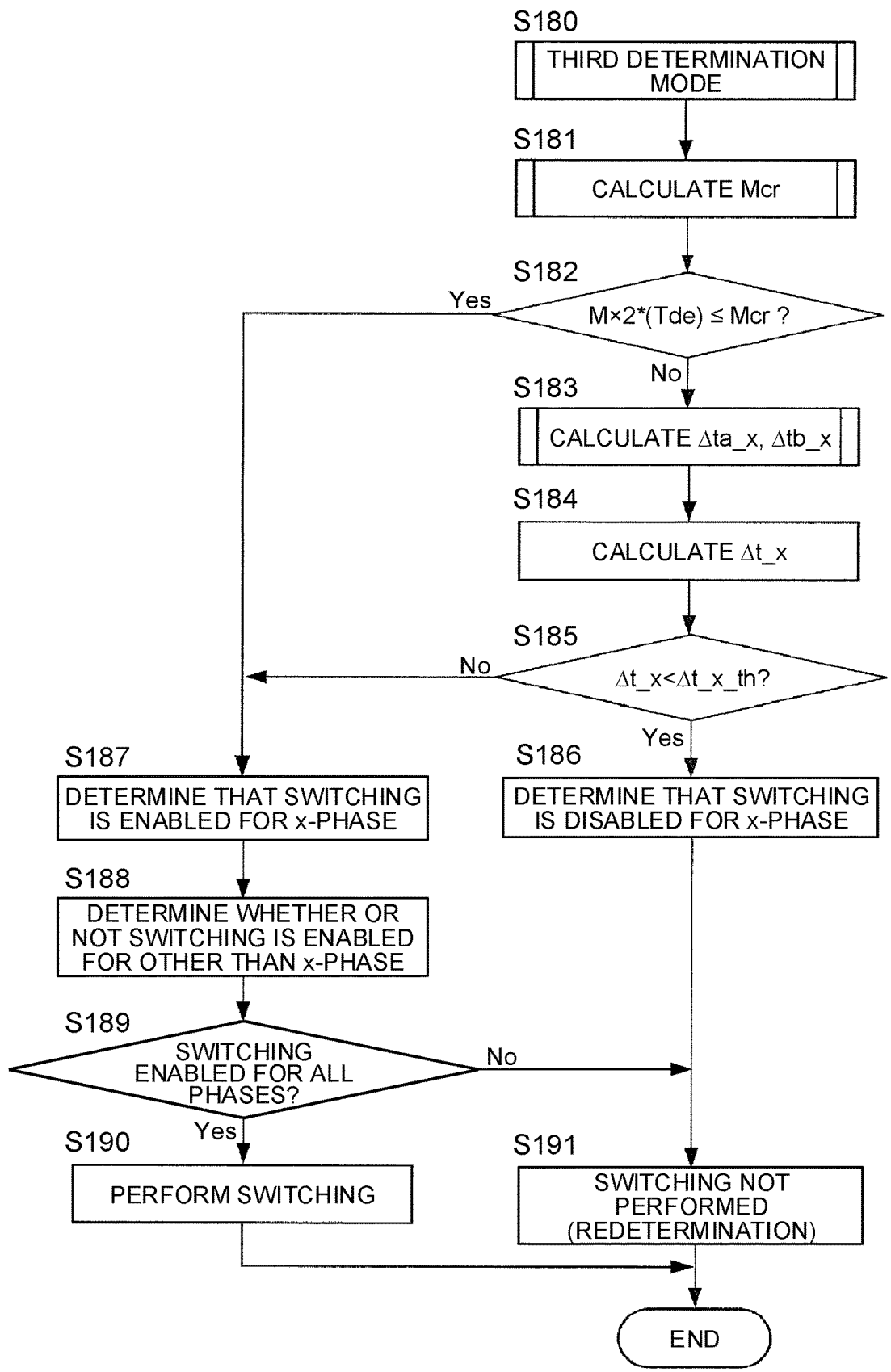
FIG. 8A is a flowchart for explaining the flow of a third switching determination mode of the first embodiment.
Figure 8B:
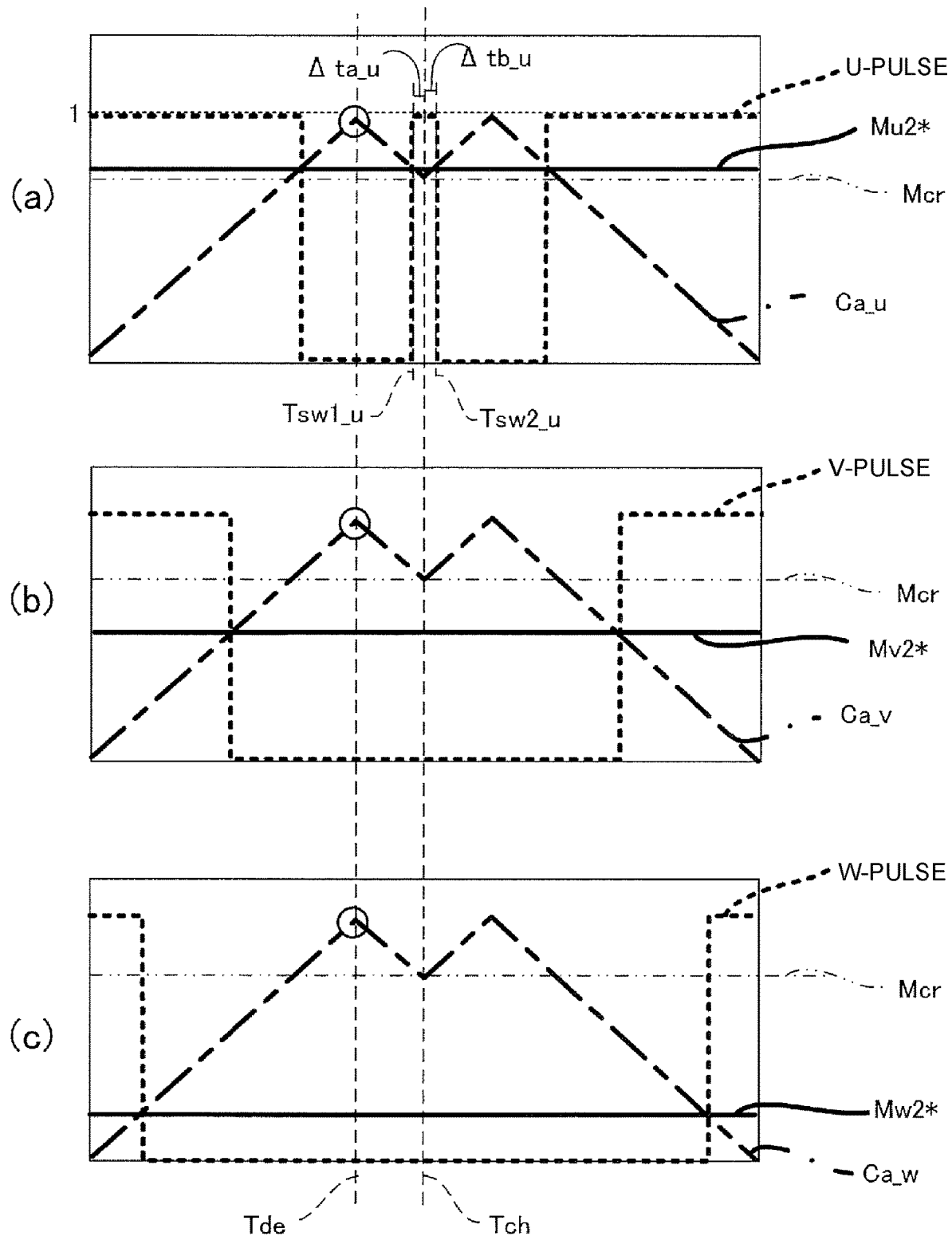
FIG. 8B is a timing chart for explaining an example of carrier wave switching in the third switching determination mode of the first embodiment.

FIG. 8A is a flowchart for explaining the flow of the third switching determination mode. FIG. 8B is a timing chart for explaining an example of the carrier wave switching in the third switching determination mode.

At step S181, like in the case of the second switching determination mode, the carrier wave switching unit 58 calculates a cross point value Mcr based on the above formula (7) from the phase difference φ between the first carrier wave (Ca1_X) and the second carrier wave (Ca2_X).

At step S182, the carrier wave switching unit 58 determines whether or not the second modulation factor Mx2*(Tde) at the reference timing Tde is equal to or less than the cross point value Mcr. Then, when the carrier wave switching unit 58 determines that the second modulation factor Mx2*(Tde) is not equal to or less than the cross point value Mcr, the carrier wave switching unit 58 performs the processes of step S183 and subsequent steps relating to a determination as to whether or not the switching of the carrier wave of x-phase is enabled. On the other hand, when the carrier wave switching unit 58 determines that the second modulation factor Mx2*(Tde) is equal to or less than the cross point value Mcr, the carrier wave switching unit 58 performs the processes of step S187 and subsequent steps that assume that the switching of the carrier wave of x-phase is determined to be enabled.

That is, in the third switching determination mode, when the second modulation factor Mx2*(Tde) is equal to or less than the cross point value Mcr, the time until the second pulse change timing Tsw2_x is relatively long (see FIG. 8B (b), (c)). That is, the pulse time (OFF-pulse time) from the first pulse change timing Tsw1_x to the second pulse change timing Tsw2_x via the virtual switching timing Tch becomes long.

Therefore, in the third switching determination mode, when the second modulation factor Mx2*(Tde) is equal to or less than the cross point value Mcr, a shift is made to the processes of step S147 and subsequent steps that basically assume the switching of the carrier wave of x-phase to be enabled.

On the other hand, when the second modulation factor Mx2*(Tde) is not equal to or less than the cross point value Mcr, the pulse time (ON-pulse time) from the first pulse change timing Tsw1_x to the second pulse change timing Tsw2_x via the virtual switching timing Tch becomes relatively short (see FIG. 8B (a)).

Therefore, in the second switching determination mode of this embodiment, when the second modulation factor Mx2*(Tde) is not equal to or less than the cross point value Mcr, the processes of step S183 and subsequent steps are performed as a further determination process as to whether or not the carrier wave switching is enabled in terms of suppressing the surge voltage.

At step S183, the pre-switching pulse time calculation unit 68 calculates a pre-switching pulse time Δta_x based on the following formula (8).

[Math. 8]

$$\Delta\text{ta\_x} = (Mx2*(Tde) - Mcr) \times \frac{1}{2fc} \quad (8)$$

That is, the pre-switching pulse time Δta_x based on the above formula (8) corresponds to the time from the first pulse change timing Tsw1_x to the virtual switching timing Tch in the third switching determination mode (see FIG. 8B (a)).

On the other hand, the post-switching pulse time calculation unit 70 calculates a post-switching pulse time Δtb_x based on the following formula (9).

[Math. 9]

$$\Delta\text{tb\_x} = (Mx2*(Tde) - Mcr) \times \frac{1}{2fc} \quad (9)$$

Therefore, the post-switching pulse time Δtb_x of the formula (9) corresponds to the time from the virtual switching timing Tch to the second pulse change timing Tsw2_x in the third switching determination mode (see FIG. 8B (a)).

Then, at step S184, the carrier wave switching unit 58 calculates a switching time sum Δt _x by using the above formula (6) based on the pre-switching pulse time Δta_x and the post-switching pulse time Δtb_x calculated at step S183.

Then, the carrier wave switching unit 58 performs the processes of step S185 and subsequent steps that are the same as the processes described at step S145 and subsequent steps in FIG. 6A.

By the processes described above, also in the third switching determination mode, it is possible to suppress the switching of the carrier wave in the situation where the surge voltage can be caused, and to detect an appropriate timing so as to perform the switching of the carrier wave.

Next, the fourth switching determination mode (the case where the phase is advanced before and after the carrier wave switching with the reference timing Tde at which the carrier wave is at the peak) of step S200 illustrated in FIG. 5 will be described.

Figure 9A:
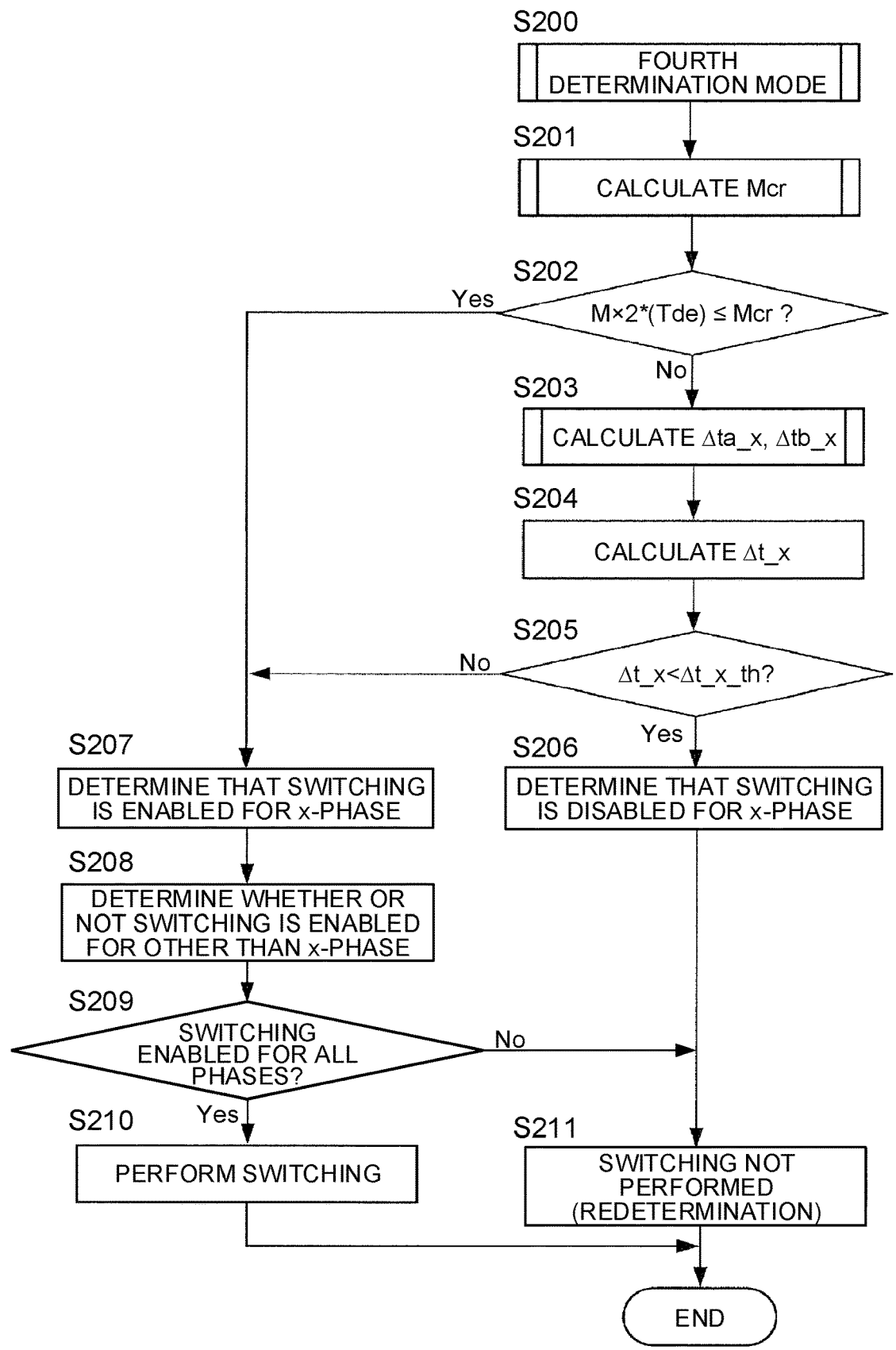
FIG. 9A is a flowchart for explaining the flow of a fourth switching determination mode of the first embodiment.
Figure 9B:
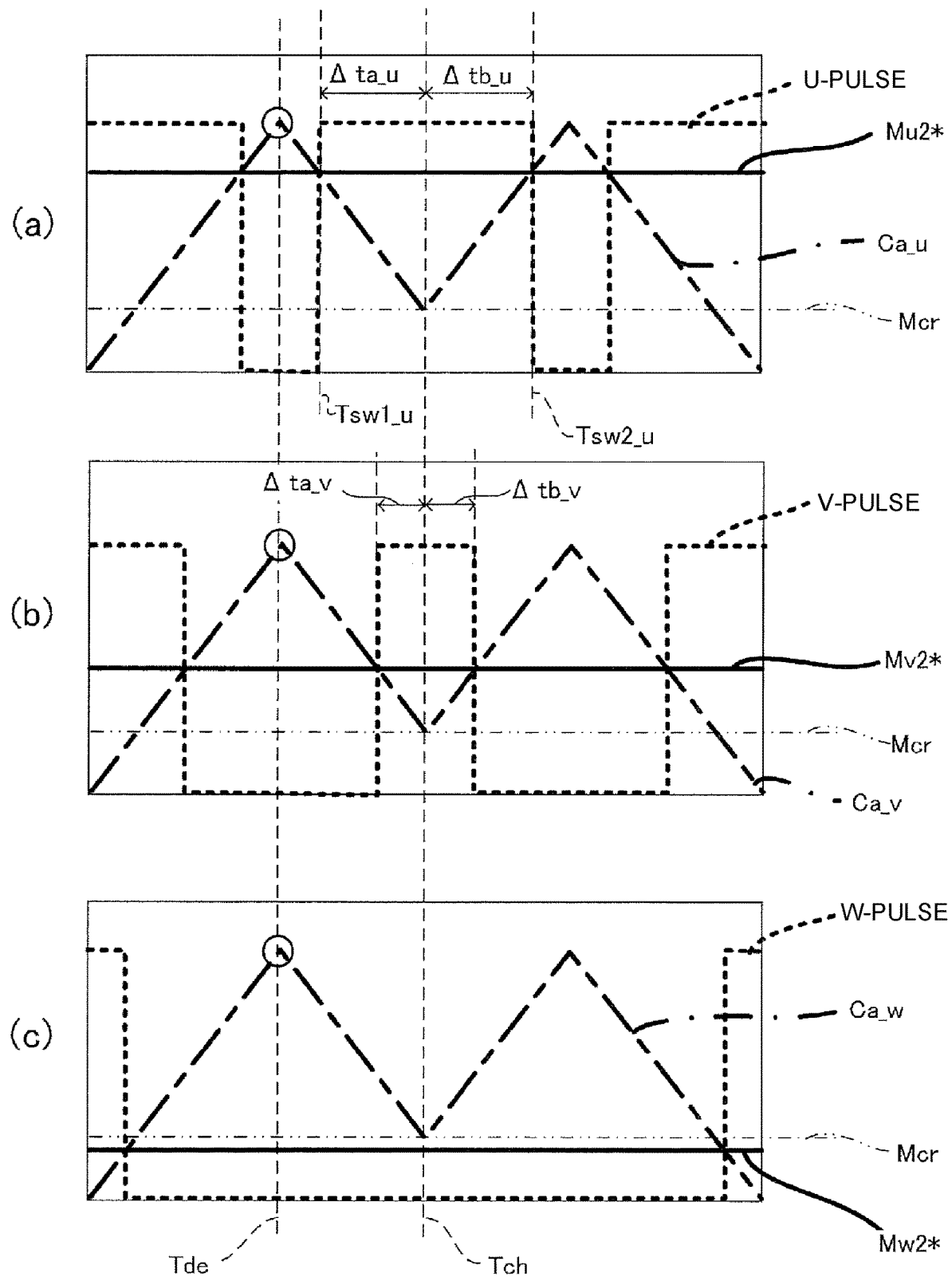
FIG. 9B is a timing chart for explaining an example of carrier wave switching in the fourth switching determination mode of the first embodiment.

FIG. 9A is a flowchart for explaining the flow of the fourth switching determination mode. FIG. 9B is a timing chart for explaining an example of the carrier wave switching in the fourth switching determination mode.

At step S201, like in the case of the first switching determination mode, the carrier wave switching unit 58 calculates a cross point value Mcr based on the above formula (3) from the phase difference φ between the first carrier wave (Ca1_X) and the second carrier wave (Ca2_X).

Further, at step 203, the pre-switching pulse time calculation unit 68 and the post-switching pulse time calculation unit 70 of the carrier wave switching unit 58 respectively calculate a pre-switching pulse time Δta_x and a post-switching pulse time Δtb_x in the fourth switching determination mode based on the above formulas (4) and (5).

Then, at step S204, the carrier wave switching unit 58 calculates a switching time sum Δt_x by using the above formula (6) based on the pre-switching pulse time Δta_x and the post-switching pulse time Δtb_x calculated at step S203.

Then, the carrier wave switching unit 58 performs the processes of step S205 and subsequent steps that are the same as the processes described at step S145 and subsequent steps in FIG. 6A.

By the processes described above, also in the fourth switching determination mode, it is possible to suppress the switching of the carrier wave in the situation where the surge voltage can be caused, and to detect an appropriate timing so as to perform the switching of the carrier wave.

Next, a description will be given of one example of the manner of setting the threshold time Δt_x_th that is used as the index of the length of the switching time sum Δt_x (pulse time) in terms of suppressing the surge voltage described above (see step S145 in FIG. 6A, etc.).

Figure 10:
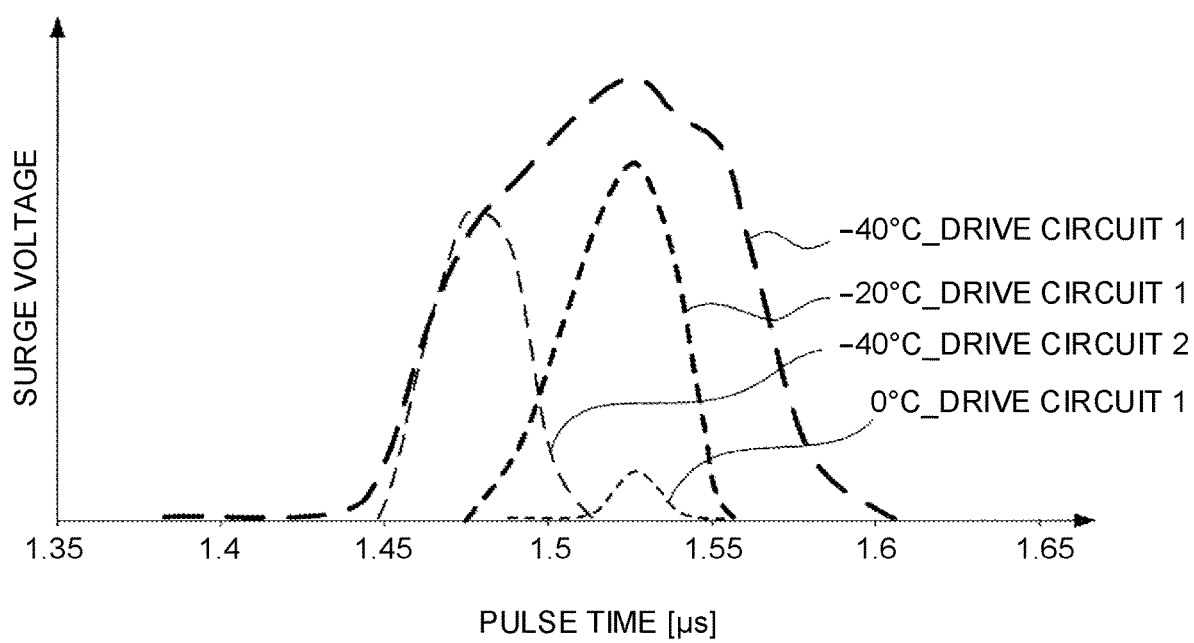
FIG. 10 is a graph illustrating the relationship between the OFF-pulse time and the surge voltage.

FIG. 10 is a diagram illustrating the relationship between the OFF-pulse time and the surge voltage in the first embodiment. More specifically, FIG. 10 illustrates one example of the trend of surge voltages that are generated with respect to the OFF-pulse times corresponding to the temperatures of elements in predetermined two types of drive circuits (bridge circuits) as models of the second bridge circuit 6.

Herein, as illustrated in FIG. 10, the peaks of the surge voltages are present with respect to the OFF-pulse times that are determined according to the temperatures of the semiconductor elements of the two types of the different drive circuits 1, 2. The peaks at which the surge voltages become large generally tend to be present in a region where the OFF-pulse time is relatively small (e.g. 1.45 to less than 1.6 μsec). As seen from FIG. 10, the trend of the surge voltage with respect to the OFF-pulse time also differs depending on the two types of the drive circuits 1, 2.

That is, the trend of the surge voltage with respect to the pulse time depends on at least the semiconductor temperature, the circuit characteristics, and the semiconductor characteristics of the bridge circuit.

Therefore, taking into account the trend illustrated in FIG. 10, in terms of properly suppressing that the carrier wave switching is performed at the OFF-pulse time at which the surge voltage takes the peak, the threshold time $\Delta t\_x\_th$ for determining that the carrier wave switching is disabled can be set to a value that is large enough to avoid the OFF-pulse times around the peaks of the surge voltages.

Further, as described above, the OFF-pulse time at which the surge voltage takes the peak depends on the temperature of the semiconductor elements forming the bridge circuit. Therefore, the threshold time $\Delta t\_x\_th$ can also be set according to the temperature of the semiconductor elements. For example, the semiconductor temperature characteristics according to the specifications of the power conversion control device 2, the first motor 7, the second motor 8, and so on are confirmed in advance by experiments or the like, and taking into account the relationship between the OFF-pulse time and the surge voltage according to the obtained semiconductor temperature characteristics, the threshold time $\Delta t\_x\_th$ can be set to a time that can suppress the surge voltage, or a value larger than such a time.

According to the first embodiment described above, the following operations and effects are exhibited.

In the power conversion control method of this embodiment, the PWM signals (Duty-up1, Duty-un1, Duty-vp1, Duty-vn1, Duty-wp1, Duty-wn1) and the PWM signals (Duty-up2, Duty-un2, Duty-vp2, Duty-vn2, Duty-wp2, Duty-wn2) that are respectively output to the first three-phase bridge circuit 4 and the second three-phase bridge circuit 6 connected in parallel to the battery 1 as the DC power supply and respectively connected to the first motor 7 and the second motor 8 as the inductive loads, are generated.

Then, one of the first carrier wave (Ca1_X) for outputting the PWM signal to the first bridge circuit 4 and the second carrier wave (Ca2_X) with the predetermined phase difference φ to the first carrier wave (Ca1_X) is selected (the carrier wave selection unit 64 in FIG. 3), and based on the selected carrier wave (CaIn_pre_X) as the carrier wave selected, the switching control of the command carrier wave (CaIn_X) being the carrier wave for outputting the PWM signal to the second bridge circuit 6 is performed (the carrier wave switching unit 58).

Then, in the switching control of the carrier wave (see FIGS. 6A, 7A, 8A, and 9A), the pre-switching pulse time $\Delta ta\_x$ being the time from a first conductive state switching timing (the first pulse change timing Tsw1_x) that is the conductive state switching timing of the second bridge circuit 6 immediately before the virtual switching timing Tch as a predetermined carrier wave switching timing, to the virtual switching timing Tch is calculated (see step S143 in FIG. 6A, etc.), and the post-switching pulse time $\Delta tb\_x$ being the time from the virtual switching timing Tch to a second conductive state switching timing (the second pulse change timing Tsw2_x) that is an initial conductive state switching timing after the virtual switching timing Tch is calculated (see step S143 in FIG. 6A, etc.).

Then, when the conductive state of the second bridge circuit 6 is not switched at the virtual switching timing Tch (i.e. when the magnitude relationship between the second modulation factor Mx2* and the value of the carrier wave does not change even by switching the carrier wave), it is determined that the switching of the carrier wave is disabled when the switching time sum $\Delta t\_x$ being the sum of the pre-switching pulse time $\Delta ta\_x$ and the post-switching pulse time $\Delta tb\_x$ is less than the threshold time $\Delta t\_x\_th$ as a predetermined pulse time sum threshold time (Yes at step S145 and step S146 in FIG. 6A).

Consequently, before the timing of performing the switching of the carrier wave (the virtual switching timing Tch), it is possible to calculate the switching time sum $\Delta t\_x$ corresponding to an ON-pulse time or an OFF-pulse time across the switching of the carrier wave. Then, by determining whether or not the switching of the carrier wave is enabled according to the calculated switching time sum $\Delta t\_x$, it is possible to suppress that the switching of the carrier wave is performed in the situation where there occurs a pulse with a small switching time sum $\Delta t\_x$ that can cause a surge voltage. As a result, it is possible to suppress the occurrence of the surge voltage so as to achieve more appropriate protection of the semiconductor elements.

Further, the timing at which the use carrier wave currently used as one of the carrier waves is at least one of a peak and a trough is set as the reference timing Tde, and the timing at which the value of the use carrier wave and the value of the other carrier wave not used agree with each other after the reference timing Tde is set as the virtual switching timing Tch.

Consequently, the calculation is performed by setting the virtual switching timing Tch to the timing at which the time corresponding to a certain period has elapsed from the reference timing Tde. Therefore, compared to a case where the calculation is performed sequentially from an arbitrary reference timing at an arbitrary calculation period, the computation load can be reduced. Further, the values of the carrier waves before and after the switching agree with each other at the virtual switching timing Tch. Therefore, since the switching of the conductive state of the second bridge circuit 6 does not occur at the time of the carrier wave switching, the calculation of the pre-switching pulse time $\Delta ta\_x$ and the post-switching pulse time $\Delta tb\_x$ is facilitated. As a result, the requirement for the performance of the hardware such as the CPU for performing the calculation can be reduced, resulting in a reduction in manufacturing cost.

In particular, in this embodiment, the pre-switching pulse time $\Delta ta\_x$ and the post-switching pulse time $\Delta tb\_x$ are calculated based on the phase difference φ between the first carrier wave (Ca1_X) and the second carrier wave (Ca2_X), the carrier wave frequency fc, and the second modulation factor Mx2*(Tde) as a modulation factor (step S143 in FIG. 6A, the formulas (3) to (5), etc.).

Consequently, the pre-switching pulse time $\Delta ta\_x$ and the post-switching pulse time $\Delta tb\_x$ can be calculated without providing various special sensors. As a result, the installation of the sensors for which high sampling is required, and the calculation that requires high load can be omitted so that it is possible to contribute to a reduction in manufacturing cost.

The threshold time Δt_x_th of this embodiment is determined based on at least one of the semiconductor temperature, the circuit characteristics, and the semiconductor characteristics of the second bridge circuit 6 (FIG. 10).

As already described, the trend of the surge voltage with respect to the pulse time changes according to the type (configuration) of the bridge circuit, or the differences in the semiconductor temperature, the circuit characteristics, and the semiconductor characteristics of the bridge circuit depending on its driving environment. Taking this into account, in this embodiment, in terms of determining whether or not the carrier wave switching is enabled, the threshold time Δt_x_th serving as the reference for the magnitude of the switching time sum Δt _x corresponding to the pulse width is set in consideration of the semiconductor temperature, the circuit characteristics, or the semiconductor characteristics of the second bridge circuit 6 so that it is possible to suppress the surge voltage more appropriately regardless of the configuration of the second bridge circuit 6 or its driving environment.

In this embodiment, the power conversion control device 2 suitable for performing the above-described power conversion control method is provided.

Specifically, in this embodiment, there is provided the power conversion control device 2 including the first three-phase bridge circuit 4 and the second three-phase bridge circuit 6 connected in parallel to the battery 1 as the DC power supply and respectively connected to the first motor 7 and the second motor 8 as the inductive loads; and the control device (the drive control device 5) configured to generate the PWM signals (Duty-up1, Duty-un1, Duty-vp1, Duty-vn1, Duty-wp1, Duty-wn1) and the PWM signals (Duty-up2, Duty-un2, Duty-vp2, Duty-vn2, Duty-wp2, Duty-wn2) that are respectively output to the first bridge circuit 4 and the second bridge circuit 6.

The drive control device 5 includes the first carrier wave generator 52 configured to generate the first carrier wave (Ca1_X) for outputting the PWM signal to the first bridge circuit 4; the second carrier wave generator 54 configured to generate the second carrier wave (Ca2_X) with the predetermined phase difference φ to the first carrier wave (Ca1_X); and the carrier wave switching unit 58 configured to select one of the first carrier wave (Ca1_X) and the second carrier wave (Ca2_X), and based on the selected carrier wave (CaIn_pre_X) as the carrier wave selected, perform the switching control of the command carrier wave (CaIn_X) being the carrier wave for outputting the PWM signal to the second bridge circuit 6.

The carrier wave switching unit 58 includes the pre-switching pulse time calculation unit 68 configured to calculate the pre-switching pulse time Δta_x being the time from a first conductive state switching timing (the first pulse change timing Tsw1_x) that is the conductive state switching timing of the second bridge circuit 6 immediately before the virtual switching timing Tch as a predetermined carrier wave switching timing, to the virtual switching timing Tch; and the post-switching pulse time calculation unit 70 configured to calculate the post-switching pulse time Δtb_x being the time from the virtual switching timing Tch to a second conductive state switching timing (the second pulse change timing Tsw2_x) that is an initial conductive state switching timing after the virtual switching timing Tch.

The carrier wave switching unit 58 is configured to, when the conductive state of the second bridge circuit 6 is not switched at the virtual switching timing Tch (i.e. when the magnitude relationship between the second modulation factor Mx2* and the value of the carrier wave does not change even by switching the carrier wave), determine that the switching of the carrier wave is disabled when the switching time sum Δt _x being the sum of the pre-switching pulse time Δta_x and the post-switching pulse time Δtb_x is less than the threshold time Δt_x_th (Yes at step S145 and step S146 in FIG. 6A).

Second Embodiment

A second embodiment will be described below with reference to FIGS. 11 to 16B. The same symbols are given to the same components as those of the first embodiment, and a description thereof is omitted.

In this embodiment, the configuration of the carrier wave command unit 56 and the flow of the process in the carrier wave switching unit 58 differ from those in the first embodiment.

Figure 11:
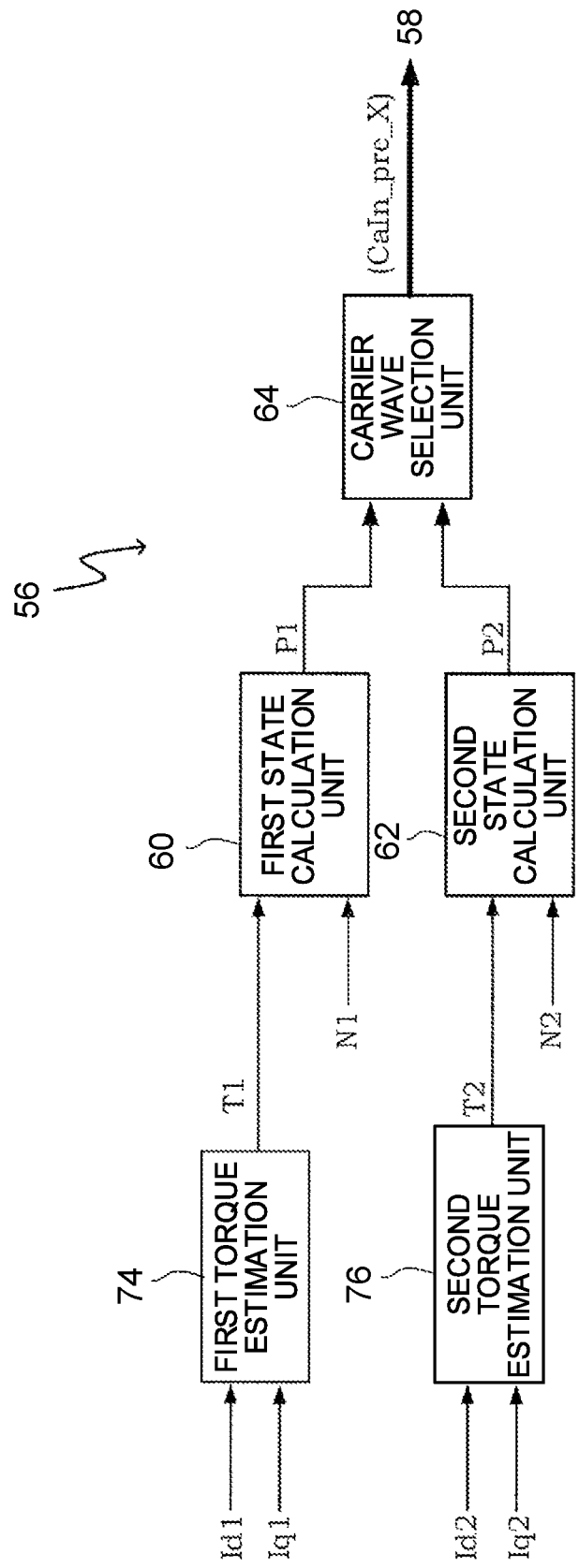
FIG. 11 is a block diagram for explaining the function of a carrier wave command unit of a second embodiment.

FIG. 11 is a block diagram for explaining the function of the carrier wave command unit 56 in this embodiment.

As illustrated, in this embodiment, the carrier wave command unit 56 includes a first torque estimation unit 74 and a second torque estimation unit 76.

The first torque estimation unit 74 acquires first dq-axis currents (Id1, Iq1) from the first phase conversion unit 34. The second torque estimation unit 76 acquires second dq-axis currents (Id2, Iq2) from the second phase conversion unit 44.

Then, based on the first dq-axis currents (Id1, Iq1), the first torque estimation unit 74 calculates a first estimated torque T1 being a torque estimated value of the first motor 7.

More specifically, the first torque estimation unit 74 calculates the first estimated torque T1 [Nm] from the following formula (10) by using the first dq-axis currents (Id1, Iq1), and an interlinkage magnetic flux Fai1 [Wb], a d-axis inductance Ld1 [H], a q-axis inductance Lq1 [H], and the number of pairs of poles Pole1 of the first motor 7.

[Math. 10]

$$T1 = \text{Pole1} \times Iq1 \times (Fai1 + (Ld1 - Lq1) \times Id1) \quad (10)$$

Likewise, based on the second dq-axis currents (Id2, Iq2), the second torque estimation unit 76 calculates a second estimated torque T2 being a torque estimated value of the second motor 8.

More specifically, the second torque estimation unit 76 calculates the second estimated torque T2 [Nm] from the following formula (11) by using the second dq-axis currents (Id2, Iq2), and an interlinkage magnetic flux Fai2 [Wb], a d-axis inductance Ld2 [H], a q-axis inductance Lq2 [H], and the number of pairs of poles Pole2 of the second motor 8.

[Math. 11]

$$T2 = \text{Pole2} \times Iq2 \times (Fai2 + (Ld2 - Lq2) \times Id2) \quad (11)$$

Then, the first torque estimation unit 74 and the second torque estimation unit 76 respectively output the calculated first estimated torque T1 and second estimated torque T2 to the first state calculation unit 60 and the second state calculation unit 62.

Then, the first state calculation unit 60 calculates a first motor output P1 from the following formula (12) based on the first estimated torque T1 and a rotation speed N1.

[Math. 12]

$$P1 = \frac{N1}{60} \times 2 \times \pi \times T1 \quad (12)$$

On the other hand, the second state calculation unit 62 calculates a second motor output P2 from the following formula (13) based on the second estimated torque T2 and a rotation speed N2.

[Math. 13]

$$P2 = \frac{N2}{60} \times 2 \times \pi \times T12 \quad (13)$$

Then, based on the first motor output P1 and the second motor output P2, the carrier wave selection unit 64 outputs one of a first carrier wave (Ca1_X) and a second carrier wave (Ca2_X) as a selected carrier wave (CaIn_pre_X) to the carrier wave switching unit 58 according to the standard described above with reference to Table 1.

Figure 12:
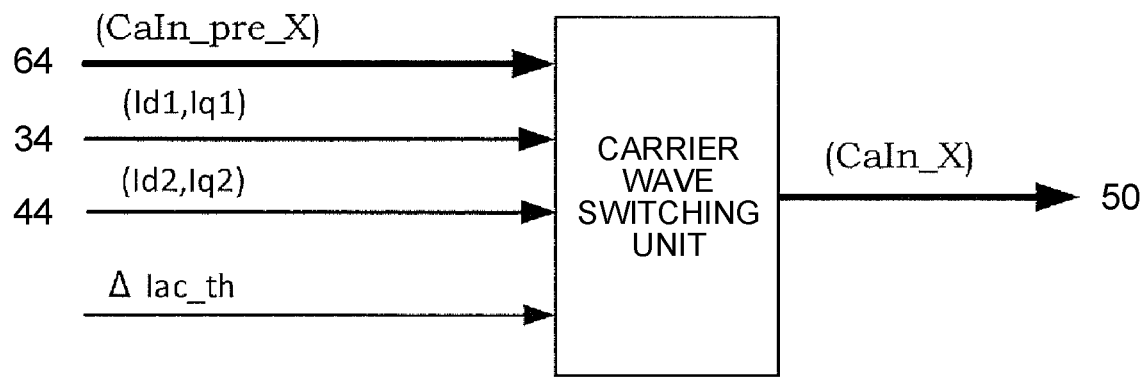
FIG. 12 is a block diagram for explaining the main part of the function of a carrier wave selection unit of the second embodiment.

FIG. 12 is a block diagram for explaining the main part of the function of the carrier wave switching unit 58 of this embodiment.

As illustrated, the carrier wave switching unit 58 of this embodiment acquires the selected carrier wave (CaIn_pre_X) from the carrier wave selection unit 64, the first dq-axis currents (Id1, Iq1) from the first phase conversion unit 34, the second dq-axis currents (Id2, Iq2) from the second phase conversion unit 44, and a predetermined current threshold value ΔIac_th determined in advance.

Then, the carrier wave switching unit 58 calculates a first phase current effective value Iac1 and a second phase current effective value Iac2 based on the following formulas (14) and (15), respectively.

[Math. 14]

$$Iac1 = \frac{\sqrt{(Id1)^2 + (Iq1)^2}}{\sqrt{3}} \quad (14)$$

[Math. 15]

$$Iac2 = \frac{\sqrt{(Id2)^2 + (Iq2)^2}}{\sqrt{3}} \quad (15)$$

That is, the first phase current effective value Iac1 corresponds to a phase current effective value of the first dq-axis currents (Id1, Iq1), and the second phase current effective value Iac2 corresponds to a phase current effective value of the second dq-axis currents (Id2, Iq2). Further, the carrier wave switching unit 58 calculates an effective value sum (Iac1+Iac2) as the sum of the first phase current effective value Iac1 and the second phase current effective value Iac2.

Then, according to the magnitude relationship between the effective value sum (Iac1+Iac2) and the current threshold value Δlac_th, the carrier wave switching unit 58 determines whether or not to output the selected carrier wave (CaIn_pre_X), as it is, as a command carrier wave (CaIn_X), i.e. whether or not to perform the switching of the carrier wave.

More specifically, when the effective value sum (Iac1+Iac2) is less than the current threshold value Δlac_th, the carrier wave switching unit 58 performs control so as not to perform the switching of the carrier wave even when the command carrier wave (CaIn_X) in the last control period corresponding to the current use carrier wave and the selected carrier wave (CaIn_pre_X) received from the carrier wave selection unit 64 in the current control period differ from each other (even when the carrier wave selection unit 64 selects the carrier wave after the switching).

That is, in this case, the carrier wave switching unit 58 performs control to maintain the command carrier wave (CaIn_X) in the last control period as it is, instead of the selected carrier wave (CaIn_pre_X) acquired from the carrier wave selection unit 64.

Note that when the effective value sum (Iac1+Iac2) is less than the current threshold value Δlac_th, even when the switching of the carrier wave is determined to be enabled for all the phases as a result of a carrier wave switching determination by a first switching determination mode to a fourth switching determination mode which will be described later, the carrier wave switching unit 58 of this embodiment performs control so as not to perform the switching of the carrier wave by taking precedence over such a determination.

Consequently, in a scene where the output of at least one of the first bridge circuit 4 and the second bridge circuit 6 is lowered (e.g. a scene where it is near 0 kW), the effective value sum (Iac1+Iac2) becomes less than the current threshold value Δlac_th so that the switching of the carrier wave is not performed. That is, it is suppressed that the phase of the carrier wave is switched frequently in such a scene.

The current threshold value Δlac_th can be arbitrarily set in terms of suppressing the frequent switching of the phase of the carrier wave described above.

In particular, in this embodiment, the current threshold value Δlac_th is set to be equal to or less than a larger value of the maximum phase current effective value that can be output by the first bridge circuit 4 in terms of its configuration (the assumed maximum value of the first phase current effective value Iac1) and the maximum phase current effective value that can be output by the second bridge circuit 6 in terms of its configuration (the assumed maximum value of the second phase current effective value Iac2).

Consequently, in the scene where the output of at least one of the first bridge circuit 4 and the second bridge circuit 6 is lowered, the carrier wave switching unit 58 more reliably makes a determination that the effective value sum (Iac1+Iac2) is less than the current threshold value Δlac_th. As a result, it is possible to suppress the frequent switching of the carrier wave more appropriately in the scene where the output of one of the bridge circuits is lowered. Further, it is also possible to reduce ripple current that can occur due to the switching of the carrier wave.

Next, in this embodiment, the first switching determination mode to the fourth switching determination mode illustrated in FIG. 5 will be described.

First, the first switching determination mode (the case where the phase is delayed before and after the carrier wave switching with a reference timing Tde at which the carrier wave is at a trough) at step S140 illustrated in FIG. 5 will be described.

Figure 13A:
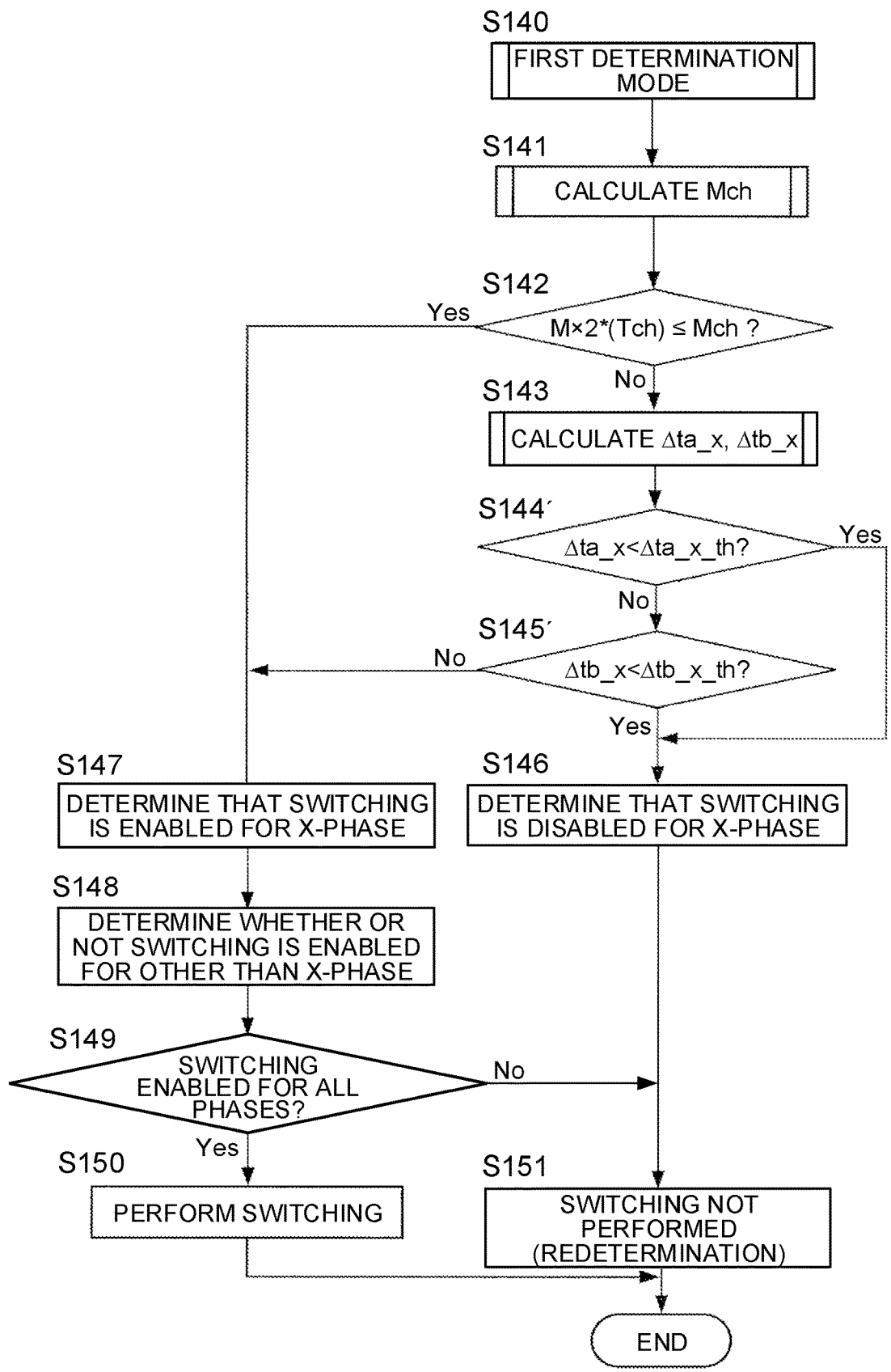
FIG. 13A is a flowchart for explaining the flow of a first switching determination mode of the second embodiment.
Figure 13B:
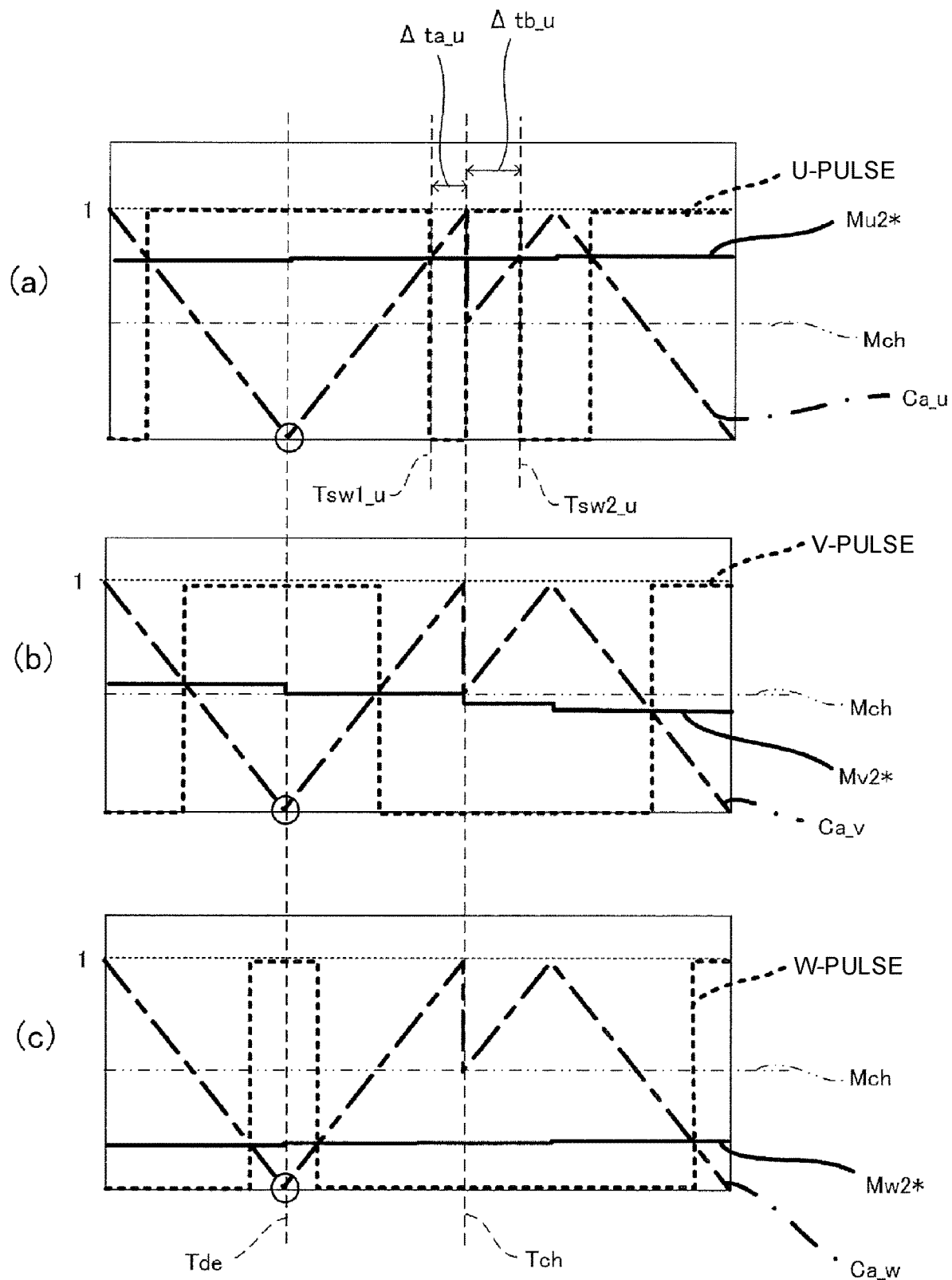
FIG. 13B is a timing chart for explaining an example of carrier wave switching in the first switching determination mode of the second embodiment.

FIG. 13A is a flowchart for explaining the flow of the first switching determination mode in this embodiment. FIG. 13B is a timing chart for explaining an example of the carrier wave switching in the first switching determination mode.

In the first switching determination mode of this embodiment, as illustrated in FIG. 13B, the timing at which the use carrier wave is at a trough is set as a reference timing Tde, and the timing of a next peak of the use carrier wave is set as a virtual switching timing Tch.

In the first switching determination mode of this embodiment, the processes of steps S141 to S143 differ from the first switching determination mode (FIG. 6A) of the first embodiment, and in addition, the processes of steps S144' and S145' are performed instead of steps S144 and S145. Therefore, hereinafter, for the simplicity of description, the processes that differ from the third switching determination mode of the first embodiment will be mainly described.

At step S141, the carrier wave switching unit 58 calculates a switching carrier wave value Mch being a value of the carrier wave after the switching from a phase difference φ between the first carrier wave (Ca1_X) and the second carrier wave (Ca2_X) by using the following formula (16).

[Math. 16]

$$Mch = 1 - 1 \times \frac{\Phi}{180} \qquad (16)$$

At step S142, the carrier wave switching unit 58 determines whether or not a second modulation factor Mx2*(Tch) at the virtual switching timing Tch is equal to or less than the switching carrier wave value Mch.

Then, when the carrier wave switching unit 58 determines that the second modulation factor Mx2*(Tch) is not equal to or less than the switching carrier wave value Mch, the carrier wave switching unit 58 performs the processes of step S143 and subsequent steps relating to a determination as to whether or not the switching of the carrier wave of x-phase is enabled. On the other hand, when the carrier wave switching unit 58 determines that the second modulation factor Mx2*(Tch) is equal to or less than the switching carrier wave value Mch, the carrier wave switching unit 58 performs the processes of step S147 and subsequent steps that assume that the switching of the carrier wave of x-phase is determined to be enabled.

Herein, when the second modulation factor Mx2*(Tch) is equal to or less than the switching carrier wave value Mch, the pulse time (OFF-pulse time) from a first pulse change timing Tsw1_x to a second pulse change timing Tsw2_x via the virtual switching timing Tch becomes relatively long (see FIG. 13B (b), (c)).

Therefore, when the second modulation factor Mx2*(Tch) is equal to or less than the switching carrier wave value Mch, a shift is made to the processes of step S147 and subsequent steps that basically assume the switching of the carrier wave of x-phase to be enabled.

On the other hand, when the second modulation factor Mx2*(Tch) is not equal to or less than the switching carrier wave value Mch, the switching from an OFF-pulse to an ON-pulse occurs in a relatively short time from the first pulse change timing Tsw1_x to the second pulse change timing Tsw2_x via the virtual switching timing Tch (see FIG. 13B (a)). That is, there is a possibility of the occurrence of a surge voltage in this scene.

Therefore, in the first switching determination mode of this embodiment, when the second modulation factor Mx2*(Tch) is not equal to or less than the switching carrier wave value Mch, the processes of step S143 and subsequent steps are performed as a further determination process as to whether or not the carrier wave switching is enabled.

At step S143, the pre-switching pulse time calculation unit 68 and the post-switching pulse time calculation unit 70 of the carrier wave switching unit 58 respectively calculate a pre-switching pulse time Δta_x and a post-switching pulse time Δtb_x based on the following formulas (17) and (18).

[Math. 17]

$$\Delta ta\_x = (1 - Mx2*(Tde)) \times \frac{1}{2fc} \qquad (17)$$

[Math. 18]

$$\Delta tb\_x = (Mx2*(Tch) - Mch) \times \frac{1}{2fc} \qquad (18)$$

At step S144', the carrier wave switching unit 58 determines whether or not the pre-switching pulse time Δta_x is less than a pre-switching pulse time threshold value Δta_x_th. When the carrier wave switching unit 58 determines that the pre-switching pulse time Δta_x is less than the pre-switching pulse time threshold value Δta_x_th, the carrier wave switching unit 58 proceeds to step S146 and determines that the switching of the carrier wave of X-phase is disabled.

That is, when the pre-switching pulse time Δta_x is less than a certain degree, there is a possibility of the occurrence of a short time pulse that causes a surge voltage. Therefore, in this embodiment, in order to avoid this, when the pre-switching pulse time Δta_x is not less than the pre-switching pulse time threshold value Δta_x_th, it is determined that the switching of the carrier wave of x-phase is disabled.

On the other hand, when the carrier wave switching unit 58 determines that the pre-switching pulse time Δta_x is less than the pre-switching pulse time threshold value Δta_x_th, the carrier wave switching unit 58 proceeds to step S145'.

At step S145', the carrier wave switching unit 58 determines whether or not the post-switching pulse time Δtb_x is less than a post-switching pulse time threshold value Δtb_x_th. When the carrier wave switching unit 58 determines that the post-switching pulse time Δtb_x is less than the post-switching pulse time threshold value Δtb_x_th, the carrier wave switching unit 58 proceeds to step S146 and determines that the switching of the carrier wave of X-phase is disabled.

That is, in this case, since it is determined that the pulse time from the virtual switching timing Tch to the second pulse change timing Tsw2_x is shorter than a certain degree, the switching of the carrier wave of x-phase is determined to be disabled.

On the other hand, when the carrier wave switching unit 58 determines that the post-switching pulse time Δtb_x is not less than the post-switching pulse time threshold value Δtb_x_th, the carrier wave switching unit 58 further determines at step S147 that the switching of the carrier wave of x-phase is enabled, and performs the subsequent processes.

By the processes described above, with the configuration of this embodiment, it is also possible to realize the suitable first switching determination mode that can suppress the surge voltage.

Next, the second switching determination mode (the case where the phase is advanced before and after the carrier wave switching with a reference timing Tde at which the carrier wave is at a trough) of this embodiment will be described.

Figure 14A:
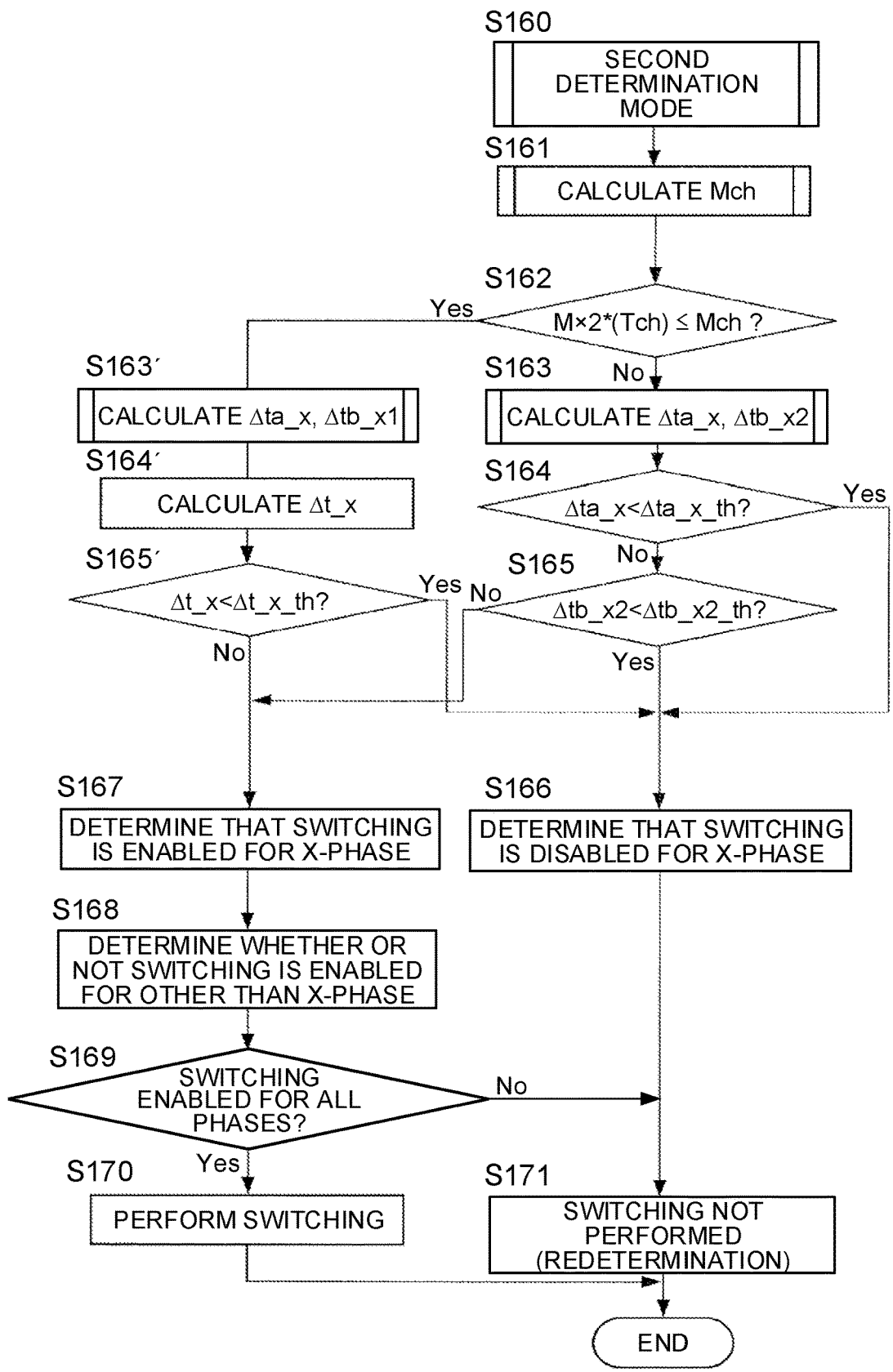
FIG. 14A is a flowchart for explaining the flow of a second switching determination mode of the second embodiment.

FIG. 14A is a flowchart for explaining the flow of the second switching determination mode. FIG. 7B is a timing chart for explaining an example of the carrier wave switching in the second switching determination mode.

Figure 14B:
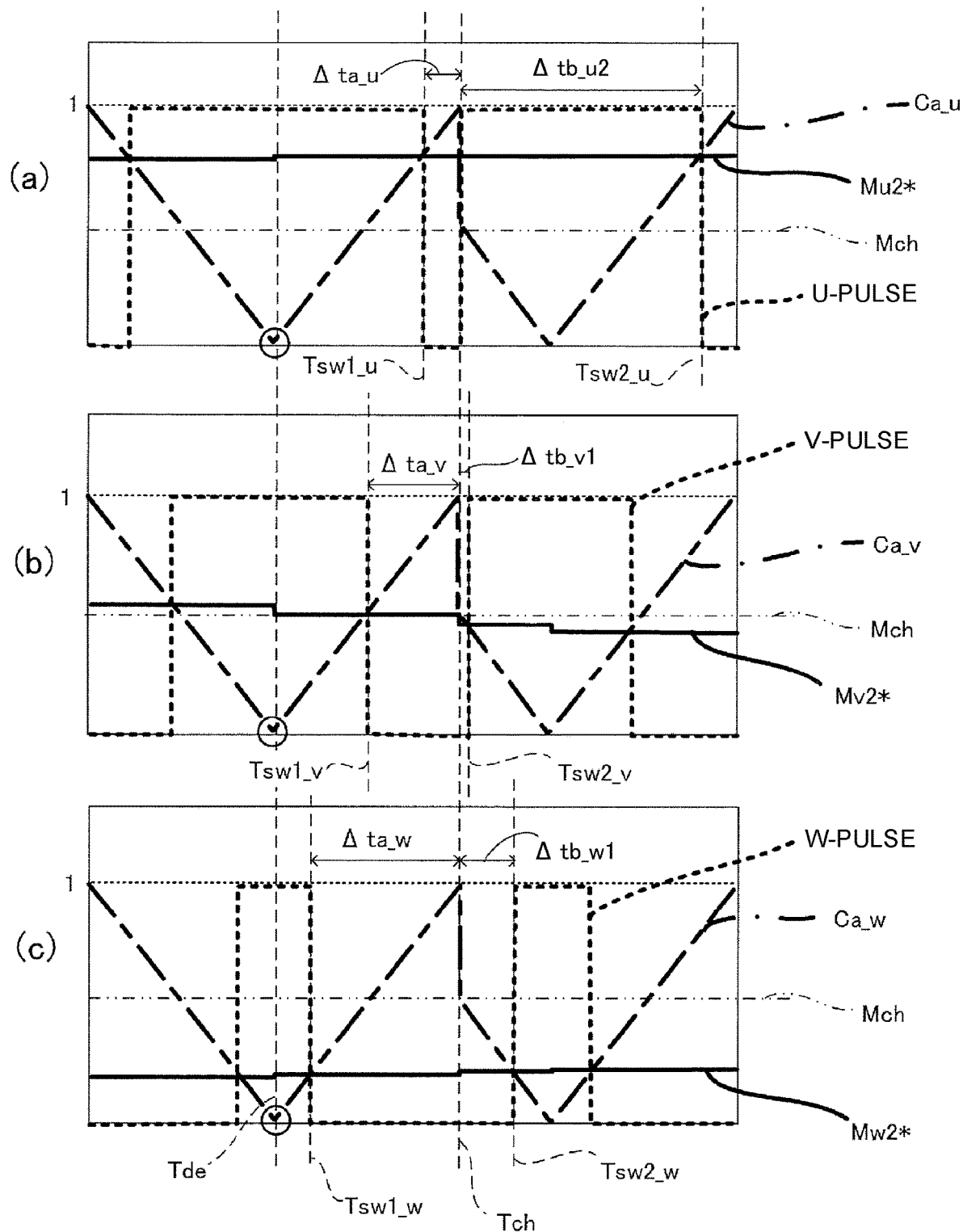
FIG. 14B is a timing chart for explaining an example of carrier wave switching in the second switching determination mode of the second embodiment.

In the second switching determination mode of this embodiment, as illustrated in FIG. 14B, the timing at which the use carrier wave is at a trough is set as a reference timing Tde, and the timing of a next peak of the use carrier wave is set as a virtual switching timing Tch.

In the second switching determination mode of this embodiment, the processes of steps S161 to S165 differ from the second switching determination mode (FIG. 7A) of the first embodiment, and in addition, the processes of steps S163', S164', and S165' are performed. Therefore, hereinafter, for the simplicity of description, only the processes that differ from the second switching determination mode of the first embodiment will be described.

At step S161, the carrier wave switching unit 58 calculates a switching carrier wave value Mch described above from the phase difference ϕ between the first carrier wave (Ca1_X) and the second carrier wave (Ca2_X) by using the above formula (16).

At step S162, the carrier wave switching unit 58 determines whether or not a second modulation factor Mx2*(Tch) at the virtual switching timing Tch is equal to or lower than the switching carrier wave value Mch.

Then, when the carrier wave switching unit 58 determines that the second modulation factor Mx2*(Tch) is not equal to or lower than the switching carrier wave value Mch, the carrier wave switching unit 58 performs the processes of step S163 and subsequent steps. On the other hand, when the carrier wave switching unit 58 determines that the second modulation factor Mx2*(Tch) is equal to or lower than the switching carrier wave value Mch, the carrier wave switching unit 58 performs the processes of step S163' and subsequent steps.

First, the processes when the second modulation factor Mx2*(Tch) is determined to be equal to or lower than the switching carrier wave value Mch will be described.

At step S163', the pre-switching pulse time calculation unit 68 of the carrier wave switching unit 58 calculates a pre-switching pulse time Δta_x based on the above formula (17).

On the other hand, the post-switching pulse time calculation unit 70 of the carrier wave switching unit 58 calculates a first post-switching pulse time Δtb_x1 based on the following formula (19).

[Math. 19]

$$\Delta tb\_x1 = (Mch + Mx2*(Tch)) \times \frac{1}{2fc} \quad (19)$$

Herein, the first post-switching pulse time Δtb_x1 corresponds to a pulse time from the virtual switching timing Tch coinciding with a switching timing of the conductive state of the second bridge circuit 6 (timing at which the value of the carrier wave and the second modulation factor Mx2*(Tch) agree with each other) to a second pulse change timing Tsw2_x being a next conductive state switching timing (see FIG. 14B (a)).

At step S164', the carrier wave switching unit 58 calculates a switching time sum Δt_x based on the following formula (20). [Math. 20]

$$\Delta t\_x + \Delta ta\_x + \Delta tb\_x1 \quad (20)$$

Then, at step S165', the carrier wave switching unit 58 determines whether or not Δt_x is less than the threshold time Δt_x_th. When the carrier wave switching unit 58 determines that Δt_x is less than the threshold time Δt_x_th, the carrier wave switching unit 58 proceeds to step S166 and determines that the switching of the carrier wave of x-phase is disabled. On the other hand, when the carrier wave switching unit 58 determines that Δt_x is not less than the threshold time Δt_x_th, the carrier wave switching unit 58 proceeds to step S167 and determines that the switching of the carrier wave of x-phase is enabled.

Next, the processes when the second modulation factor Mx2*(Tch) is determined not to be equal to or lower than the switching carrier wave value Mch at step S162 will be described.

At step S163, the pre-switching pulse time calculation unit 68 of the carrier wave switching unit 58 calculates a pre-switching pulse time Δta_x based on the above formula (19).

On the other hand, the post-switching pulse time calculation unit 70 calculates a second post-switching pulse time Δtb_x2 based on the following formula (21).

[Math. 21]

$$\Delta tb\_x2 = (Mch - Mx2*(Tch)) \times \frac{1}{2fc} \quad (21)$$

Herein, the second post-switching pulse time Δtb_x2 corresponds to a pulse time from the virtual switching timing Tch to the second pulse change timing Tsw2_x when the virtual switching timing Tch does not coincide with a switching timing of the conductive state of the second bridge circuit 6 (see FIG. 14B (b), FIG. 14B (c)).

Then, at step S164, the carrier wave switching unit 58 determines whether or not the pre-switching pulse time Δta_x is less than the pre-switching pulse time threshold value Δta_x_th. When the carrier wave switching unit 58 determines that the pre-switching pulse time Δta_x is less than the pre-switching pulse time threshold value Δta_x_th, the carrier wave switching unit 58 proceeds to step S166 and determines that the switching of the carrier wave of x-phase is disabled.

That is, when the pre-switching pulse time Δta_x is less than a certain degree, there is a possibility of the occurrence of a short time pulse that causes a surge voltage. Therefore, in this embodiment, in order to avoid this, when the pre-switching pulse time Δta_x is not less than the pre-switching pulse time threshold value Δta_x_th, it is determined that the switching of the carrier wave of x-phase is disabled.

On the other hand, when the carrier wave switching unit 58 determines that the pre-switching pulse time Δta_x is not less than the pre-switching pulse time threshold value Δta_x_th, the carrier wave switching unit 58 further makes a determination at step S165.

At step S165, the carrier wave switching unit 58 determines whether or not the second post-switching pulse time Δtb_x2 is less than a predetermined post-switching pulse time threshold value Δtb_x2 th. When the carrier wave switching unit 58 determines that the second post-switching pulse time Δtb_x2 is less than the post-switching pulse time threshold value Δtb_x2_th, the carrier wave switching unit 58 proceeds to step S166 and determines that the switching of the carrier wave of X-phase is disabled.

That is, in this case, it is determined that the time from the virtual switching timing Tch to the second pulse change timing Tsw2_x is shorter than a certain degree, and therefore, in terms of avoiding the occurrence of a short time pulse, the carrier wave switching unit 58 of this embodiment determines in this case that the switching of the carrier wave of x-phase is disabled.

On the other hand, when the carrier wave switching unit 58 determines that the second post-switching pulse time Δtb_x2 is not less than the post-switching pulse time threshold value Δtb_x2_th, the carrier wave switching unit 58 determines at step S167 that the switching of the carrier wave of x-phase is enabled, and performs the subsequent processes.

By the processes described above, with the configuration of this embodiment, it is also possible to realize the suitable second switching determination mode that can suppress the surge voltage.

Next, the third switching determination mode (the case where the phase is delayed before and after the carrier wave switching with a reference timing Tde at which the carrier wave is at a peak) of this embodiment will be described.

Figure 15A:
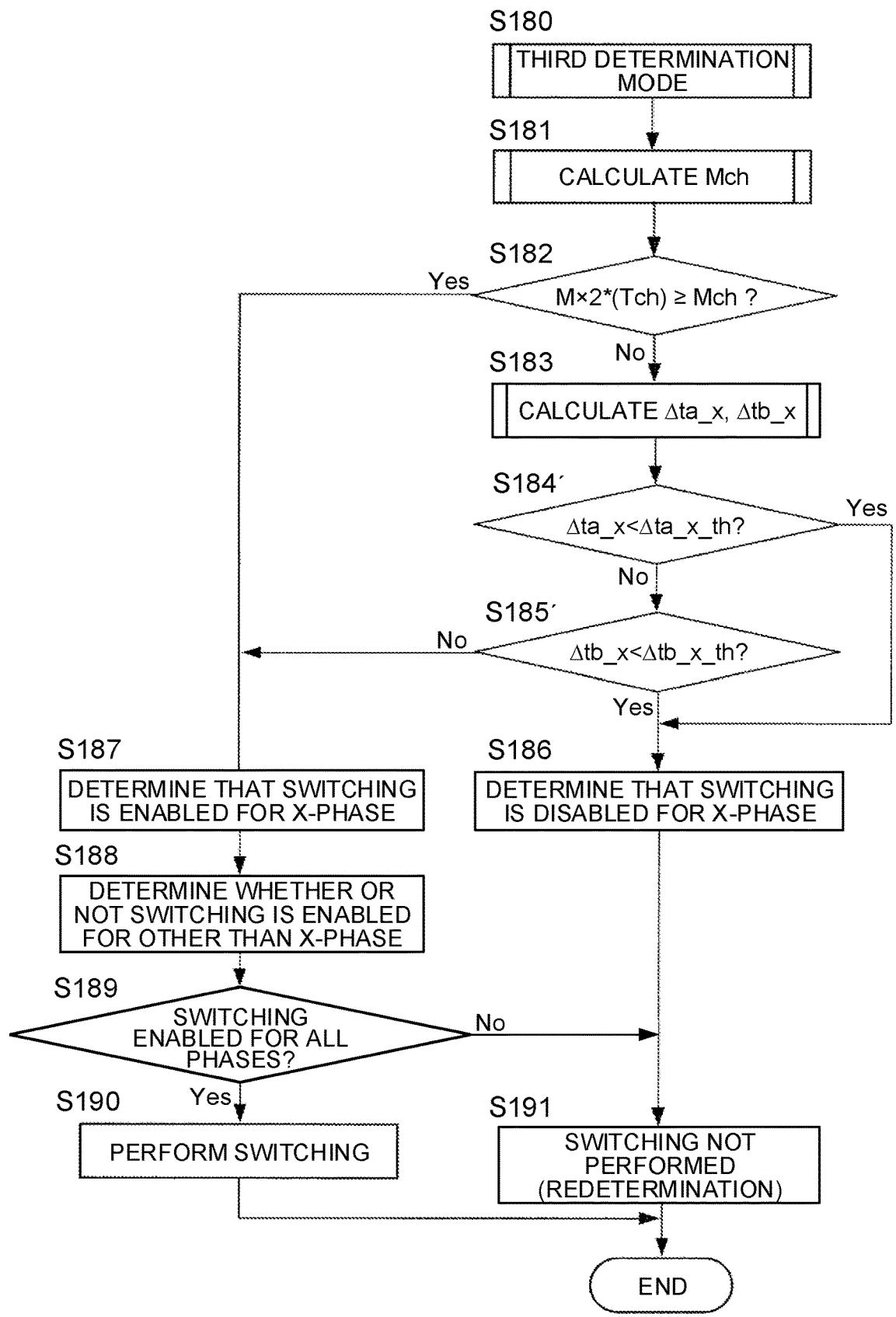
FIG. 15A is a flowchart for explaining the flow of a third switching determination mode of the second embodiment.
Figure 15B:
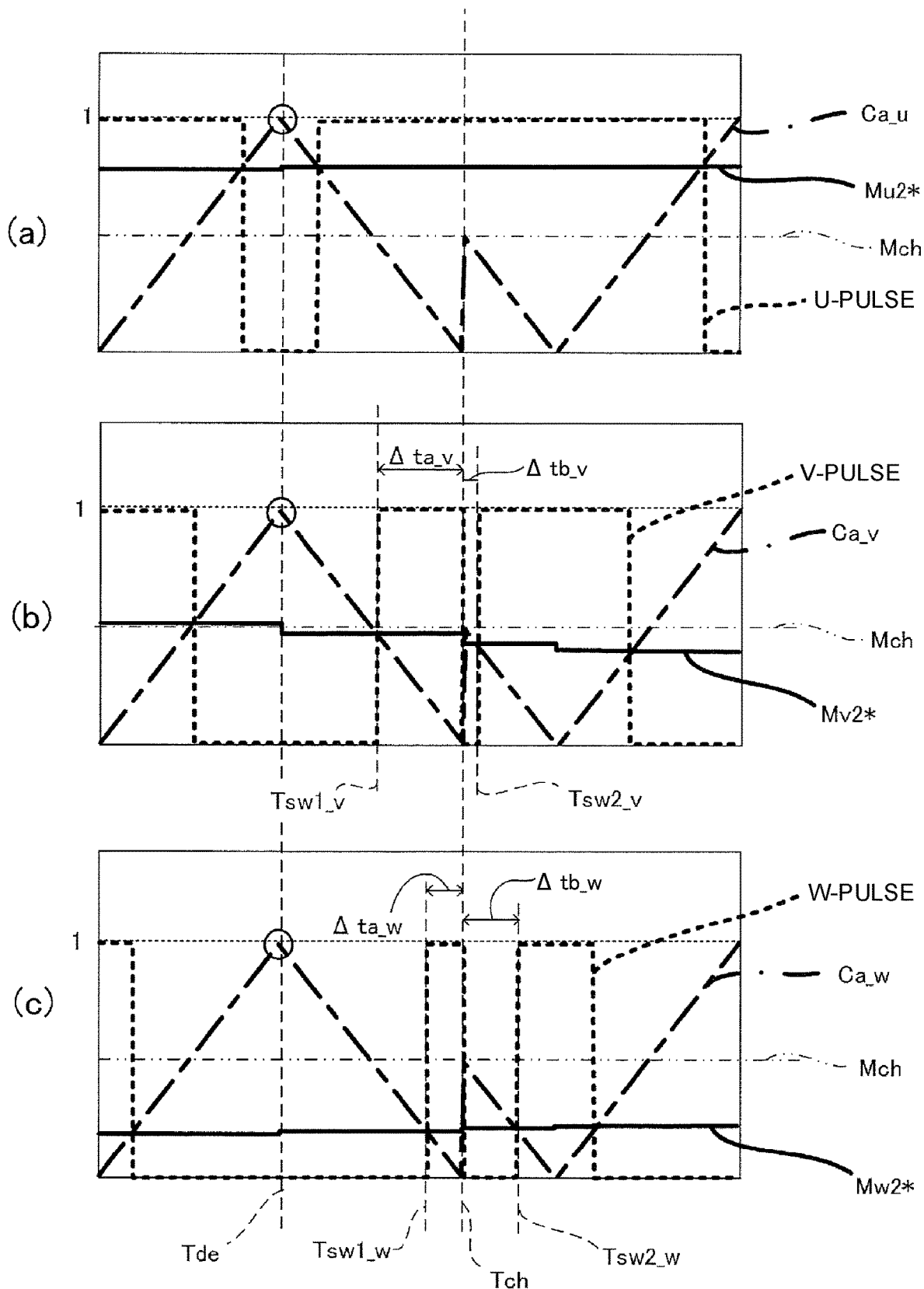
FIG. 15B is a timing chart for explaining an example of carrier wave switching in the third switching determination mode of the second embodiment.

FIG. 15A is a flowchart for explaining the flow of the third switching determination mode. FIG. 15B is a timing chart for explaining an example of the carrier wave switching in the third switching determination mode.

In the third switching determination mode of this embodiment, as illustrated in FIG. 15B, the timing at which the use carrier wave is at a peak is set as a reference timing Tde, and the timing of a next trough of the use carrier wave is set as a virtual switching timing Tch.

In the third switching determination mode of this embodiment, the processes of steps S181 to S183 differ from the third switching determination mode (FIG. 8A) of the first embodiment, and in addition, the processes of steps S184' and S185' are performed instead of steps S184 and S185. Therefore, hereinafter, for the simplicity of description, only the processes that differ from the third switching determination mode of the first embodiment will be described.

At step S181, the carrier wave switching unit 58 calculates a switching carrier wave value Mch being a value of the carrier wave after the switching from the phase difference ϕ between the first carrier wave (Ca1_X) and the second carrier wave (Ca2_X) by using the following formula (22).

[Math. 22]

$$Mch = 1 \times \frac{\Phi}{180} \quad (22)$$

At step S182, the carrier wave switching unit 58 determines whether or not a second modulation factor Mx2*(Tch) at the virtual switching timing Tch is equal to or larger than the switching carrier wave value Mch.

Then, when the carrier wave switching unit 58 determines that the second modulation factor Mx2*(Tch) is not equal to or larger than the switching carrier wave value Mch, the carrier wave switching unit 58 performs the processes of step S183 and subsequent steps. On the other hand, when the carrier wave switching unit 58 determines that the second modulation factor Mx2*(Tch) is equal to or larger than the switching carrier wave value Mch, the carrier wave switching unit 58 performs the processes of step S187 and subsequent steps.

Herein, when the second modulation factor Mx2*(Tch) is equal to or larger than the switching carrier wave value Mch, the pulse time (ON-pulse time) from a first pulse change timing Tsw1_x to a second pulse change timing Tsw2_x via the virtual switching timing Tch becomes relatively long (see FIG. 15B (a)).

Therefore, when the second modulation factor Mx2*(Tch) is equal to or larger than the switching carrier wave value Mch, a shift is made to the processes of step S187 and subsequent steps that basically assume the switching of the carrier wave of x-phase to be enabled.

On the other hand, when the second modulation factor Mx2*(Tch) is not equal to or larger than the switching carrier wave value Mch, the switching from an OFF-pulse to an ON-pulse occurs in a relatively short time from the first pulse change timing Tsw1_x to the second pulse change timing Tsw2_x via the virtual switching timing Tch (see FIG. 15B (b), (c)). That is, there is a possibility of the occurrence of a surge voltage in this scene.

Therefore, in the third switching determination mode of this embodiment, when the second modulation factor Mx2*(Tch) is not equal to or larger than the switching carrier wave value Mch, the processes of step S183 and subsequent steps are performed as a further determination process as to whether or not the carrier wave switching is enabled.

At step S183, the pre-switching pulse time calculation unit 68 of the carrier wave switching unit 58 calculates a pre-switching pulse time Δta_x based on the following formula (23).

[Math. 23]

$$\Delta ta\_x = (Mx2*(Tde) - 0) \times \frac{1}{2fc} \quad (23)$$

On the other hand, the post-switching pulse time calculation unit 70 of the carrier wave switching unit 58 calculates a post-switching pulse time Δtb_x based on the following formula (24).

[Math. 24]

$$\Delta tb\_x = (Mch - Mx2*(Tch)) \times \frac{1}{2fc} \quad (24)$$

Then, at steps S184' and S185', the determinations are performed in the same way as at steps S144' and S145' in the first switching determination mode.

That is, when at least one of the pre-switching pulse time Δta_x and the post-switching pulse time Δtb_x is less than the pre-switching pulse time threshold value Δta_x_th or the post-switching pulse time threshold value Δtb_x_th, the carrier wave switching unit 58 proceeds to step S186 and determines that the switching of the carrier wave of X-phase is disabled. On the other hand, if otherwise, the carrier wave switching unit 58 determines at step S187 that the switching of the carrier wave of X-phase is enabled, and performs the subsequent processes.

By the processes described above, with the configuration of this embodiment, it is also possible to realize the suitable third switching determination mode that can suppress the surge voltage.

Next, the fourth switching determination mode (the case where the phase is advanced before and after the carrier wave switching with a reference timing Tde at which the carrier wave is at a peak) of this embodiment will be described.

Figure 16A:
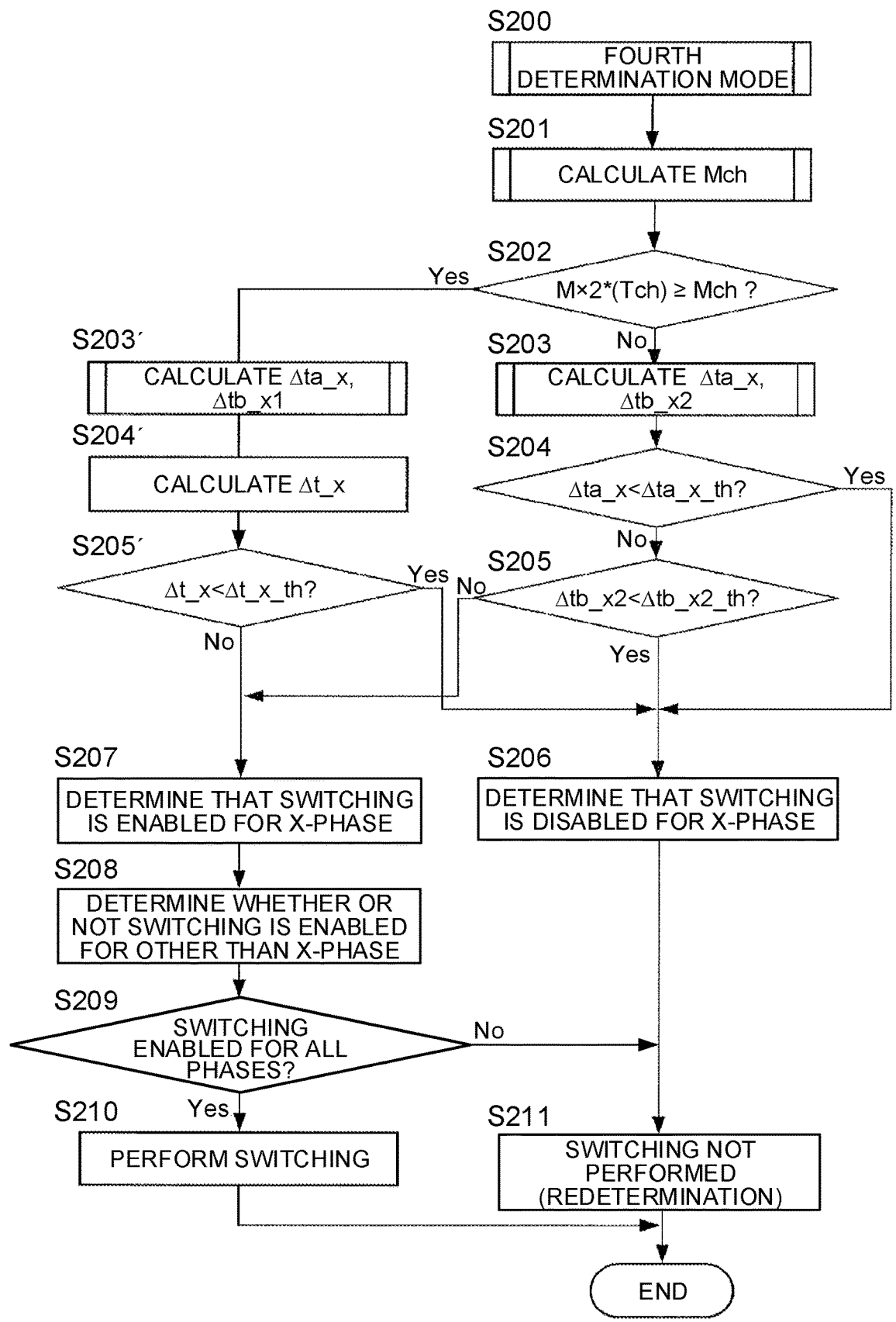
FIG. 16A is a flowchart for explaining the flow of a fourth switching determination mode of the second embodiment.
Figure 16B:
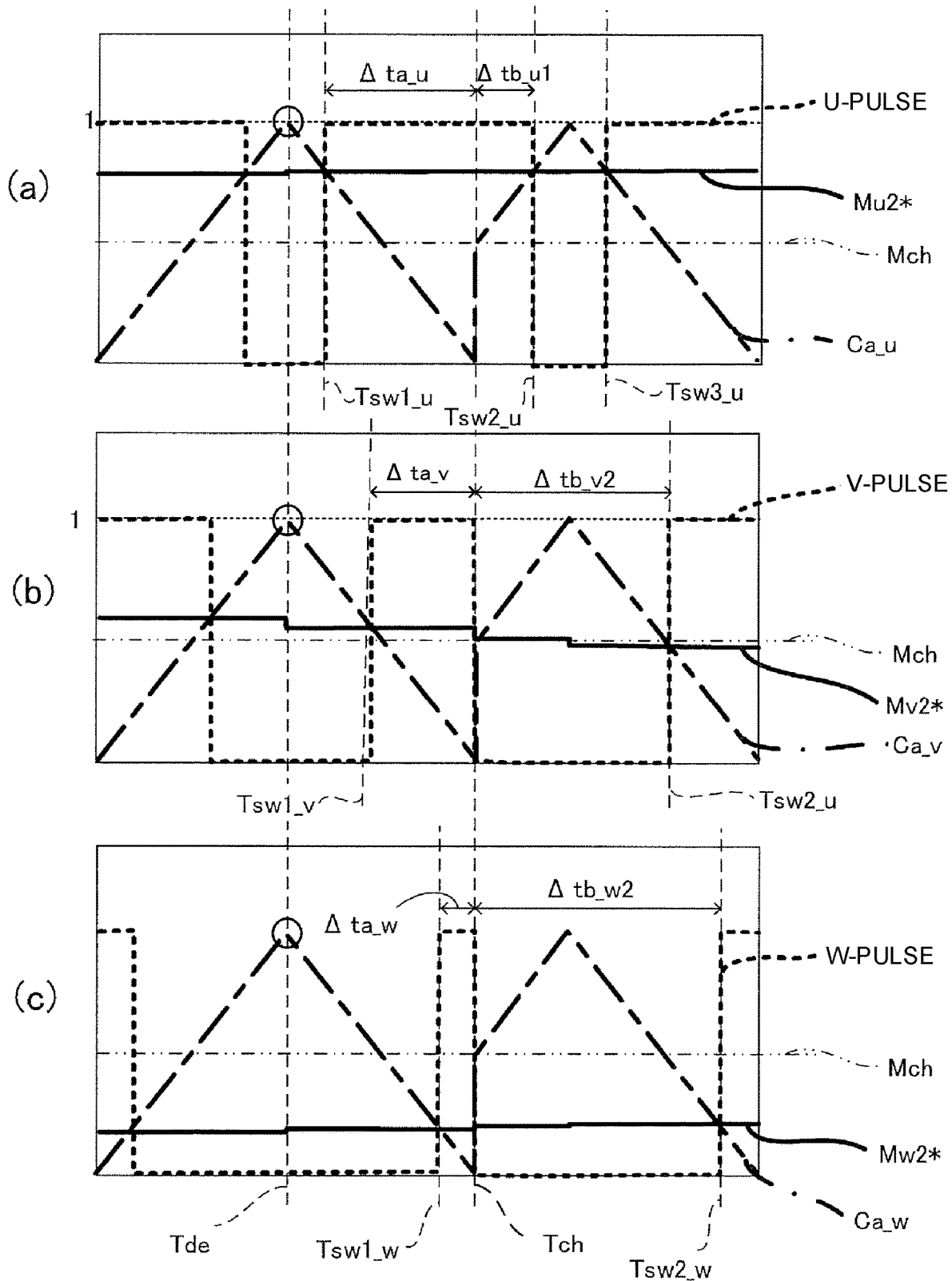
FIG. 16B is a timing chart for explaining an example of carrier wave switching in the fourth switching determination mode of the second embodiment.

FIG. 16A is a flowchart for explaining the flow of the fourth switching determination mode. FIG. 16B is a timing chart for explaining an example of the carrier wave switching in the fourth switching determination mode.

In the fourth switching determination mode of this embodiment, as illustrated in FIG. 16B, the timing at which the use carrier wave is at a peak is set as a reference timing Tde, and the timing of a next trough of the use carrier wave is set as a virtual switching timing Tch.

In the fourth switching determination mode of this embodiment, the processes of steps S201 to S205 differ from the fourth switching determination mode (FIG. 9A) of the first embodiment, and in addition, the processes of steps S203', S204', and S205' are performed. Therefore, hereinafter, for the simplicity of description, only the processes that differ from the fourth switching determination mode of the first embodiment will be described.

At step S201, the carrier wave switching unit 58 calculates a switching carrier wave value Mch from the phase difference φ between the first carrier wave (Ca1_X) and the second carrier wave (Ca2_X) by using the above formula (22).

At step S202, the carrier wave switching unit 58 determines whether or not a second modulation factor Mx2*(Tch) at the virtual switching timing Tch is equal to or larger than the switching carrier wave value Mch.

Then, when the carrier wave switching unit 58 determines that the second modulation factor Mx2*(Tch) is not equal to or larger than the switching carrier wave value Mch, the carrier wave switching unit 58 performs the processes of step S203 and subsequent steps. On the other hand, when the carrier wave switching unit 58 determines that the second modulation factor Mx2*(Tch) is equal to or larger than the switching carrier wave value Mch, the carrier wave switching unit 58 performs the processes of step S203' and subsequent steps.

First, the processes when the second modulation factor Mx2*(Tch) is determined to be equal to or larger than the switching carrier wave value Mch will be described.

At step S203', the pre-switching pulse time calculation unit 68 of the carrier wave switching unit 58 calculates a pre-switching pulse time Δta_x based on the above formula (23).

On the other hand, the post-switching pulse time calculation unit 70 of the carrier wave switching unit 58 calculates a first post-switching pulse time Δtb_x1 based on the following formula (25).

[Math. 25]

$$\Delta \text{tb}\_x1 = (Mx2*(Tch) - Mch) \times \frac{1}{2fc} \quad (25)$$

Herein, the first post-switching pulse time Δtb_x1 in the fourth switching determination mode corresponds to a pulse time from the virtual switching timing Tch to a second pulse change timing Tsw2_x (see FIG. 16B (a)).

Then, at steps S204' to S207, like at steps S164' to S167 in the second switching determination mode, the switching of the carrier wave of x-phase is determined to be enabled based on the magnitude relationship between the switching time sum Δt_x (=Δta_x+Δtb_x1) and the threshold time Δt_x_th.

Next, the processes when the second modulation factor Mx2*(Tch) is determined not to be equal to or larger than the switching carrier wave value Mch at step S202 will be described.

At step S203, the pre-switching pulse time calculation unit 68 of the carrier wave switching unit 58 calculates a pre-switching pulse time Δta_x based on the above formula (23).

On the other hand, the post-switching pulse time calculation unit 70 calculates a second post-switching pulse time Δtb_x2 based on the following formula (26).

[Math. 26]

$$\Delta \text{tb}\_x2 = (1 - Mch + 1 - Mx2*(Tch)) \times \frac{1}{2fc} \quad (26)$$

Herein, the second post-switching pulse time Δtb_x2 corresponds to a pulse time (OFF-pulse time) from the virtual switching timing Tch to the second pulse change timing Tsw2_x (see FIG. 16B (b), FIG. 16B (c)).

Then, at steps S204 and S205, the determinations are performed in the same way as at steps S164 and S165 in the second switching determination mode.

That is, when at least one of the pre-switching pulse time Δta_x and the second post-switching pulse time Δtb_x2 is less than the pre-switching pulse time threshold value Δta_x_th or the post-switching pulse time threshold value Δtb_x2_th, the carrier wave switching unit 58 proceeds to step S206 and determines that the switching of the carrier wave of x-phase is disabled. On the other hand, if otherwise, the carrier wave switching unit 58 determines at step S207 that the switching of the carrier wave of x-phase is enabled, and performs the subsequent processes.

By the processes described above, with the configuration of this embodiment, it is also possible to realize the suitable fourth switching determination mode that can suppress the surge voltage.

According to the second embodiment described above, the following operations and effects are exhibited in addition to the operations and effects of the first embodiment.

According to the power conversion control method of this embodiment, when the conductive state of the second bridge circuit 6 is switched at the virtual switching timing Tch (see FIG. 13B (a) etc.), the carrier wave switching unit 58 determines that the switching of the carrier wave is disabled when the pre-switching pulse time Δta_x or the first post-switching pulse time Δtb_x1 as the post-switching pulse time is less than the predetermined pulse time threshold value (the pre-switching pulse time threshold value Δta_x_th or the first post-switching pulse time threshold value Δtb_x1_th) (see steps S164 and S165 in FIG. 14A).

Consequently, like in the first embodiment, there is provided a switching determination that contributes to the switching of the carrier wave at the timing in which the occurrence of a surge voltage can be suppressed.

In particular, in this embodiment, the timing at which the use carrier wave currently used as one of the carrier waves is at a peak (trough) is set as the reference timing Tde, and the timing at which the use carrier wave is at a trough (peak) next after the reference timing Tde is set as the virtual switching timing Tch.

Consequently, the calculation is performed by setting the virtual switching timing Tch to the timing at which the time corresponding to a certain period (particularly, a half period of the carrier wave) has elapsed from the reference timing Tde. Therefore, compared to the case where the calculation is performed sequentially from an arbitrary reference timing at an arbitrary calculation period, the computation load can be reduced. In particular, since various calculations can be performed without detecting values of the carrier wave not used at respective timings, the computation load can be further reduced.

In this embodiment, further, when the effective value sum (Iac1+Iac2) being the sum of the first phase current effective value Iac1 as the phase current effective value output from the first bridge circuit 4 and the second phase current effective value Iac2 as the phase current effective value output from the second bridge circuit 6 is equal to or less than the predetermined current threshold value Δlac_th, it is determined that the switching of the carrier wave is disabled.

Consequently, it is possible to suppress that the switching of the carrier wave is performed in the scene where the output of at least one of the first bridge circuit 4 and the second bridge circuit 6 is lowered. As a result, it is suppressed that the phase of the carrier wave is switched frequently in such a scene.

In particular, in this embodiment, the current threshold value Δlac_th is set to be equal to or less than a higher value of the maximum value of the phase current effective value of the first bridge circuit 4 (the first phase current effective value Iac1) and the maximum value of the phase current effective value of the second bridge circuit 6 (the second phase current effective value Iac2).

Consequently, in the scene where the output of at least one of the first bridge circuit 4 and the second bridge circuit 6 is lowered, it is more reliably determined that the effective value sum (Iac1+Iac2) is less than the current threshold value Δlac_th. As a result, it is possible to suppress the frequent switching of the carrier wave more appropriately in the scene where the output of one of the bridge circuits is lowered. Further, ripple current that can occur due to the switching of the carrier wave can be suppressed within a current value range that can be output by one of the bridge circuits.

The pre-switching pulse time threshold value Δta_x_th, the first post-switching pulse time threshold value Δtb_x1_th, or the second post-switching pulse time Δtb_x2 of this embodiment may be determined based on at least one of the semiconductor temperature, the circuit characteristics, and the semiconductor characteristics of the second bridge circuit 6 given by way of example with reference to FIG. 10.

Third Embodiment

A third embodiment will be described below with reference to FIG. 17. The same symbols are given to the same components as those of the second embodiment, and a description thereof is omitted. In the power conversion control device 2 of this embodiment, particularly the configuration of the carrier wave command unit 56 in FIG. 2 differs from that of the second embodiment.

Figure 17:
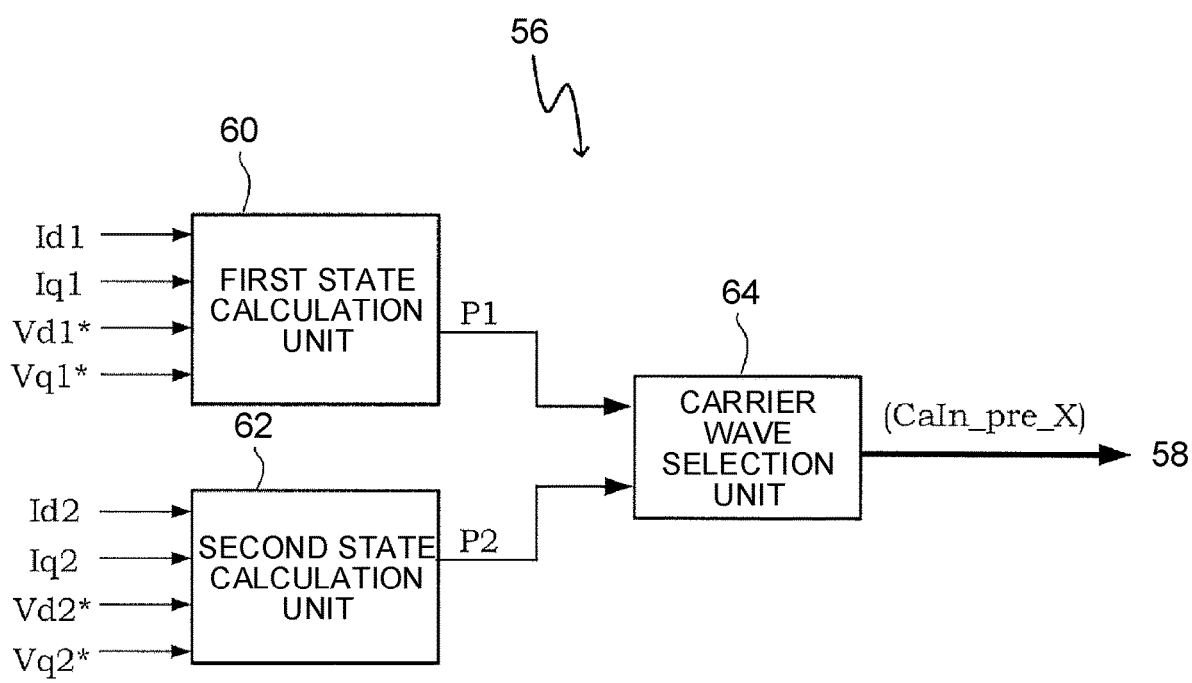
FIG. 17 is a block diagram for explaining the function of a carrier wave command unit of a third embodiment.

FIG. 17 is a block diagram for explaining the function of the carrier wave command unit 56 in this embodiment.

As illustrated, the first state calculation unit 60 of the carrier wave command unit 56 of this embodiment acquires first dq-axis currents (Id1, Iq1) and first dq-axis current command values (Id1*, Iq1*) from the first phase conversion unit 34 and the first current command generation unit 32, respectively. On the other hand, the second state calculation unit 62 acquires second dq-axis currents (Id2, Iq2) and second dq-axis current command values (Id2*, Iq2*) from the second phase conversion unit 44 and the second current command generation unit 42, respectively.

Then, the first state calculation unit 60 calculates a first motor output P1 from the following formula (27) based on the first dq-axis currents (Id1, Iq1) and the first dq-axis current command values (Id1*, Iq1*). [Math. 27]

$$P1 = Id1 \times Vd1^* + Iq1 \times Vq1^* \tag{27}$$

On the other hand, the second state calculation unit 62 calculates a second motor output P2 from the following formula (28) based on the second dq-axis currents (Id2, Iq2) and the second dq-axis current command values (Id2*, Iq2*). [Math. 28]

$$P2 = Id2 \times Vd2^* + Iq2 \times Vq2^* \tag{28}$$

As described in FIG. 12, the carrier wave switching unit 58 acquires a current threshold value Δlac_th. The current threshold value Δlac_th of this embodiment is set to be equal to or less than a value Max[Imax1,Imax2] that is larger of a maximum current Imax1 that can be continuously output by the first bridge circuit 4 when the first bridge circuit 4 is operated independently, and a maximum current Imax2 that can be continuously output by the second bridge circuit 6 when the second bridge circuit 6 is operated independently.

Then, when the effective value sum (Iac1+Iac2) is less than the current threshold value Δlac_th, the carrier wave switching unit 58 maintains the current use carrier wave without performing the carrier wave switching.

According to the third embodiment described above, the following operations and effects are exhibited.

According to the power conversion control method of this embodiment, the current threshold value Δlac_th is set to be equal to or less than the value Max[Imax1,Imax2] that is higher of the maximum current Imax1 at which the first bridge circuit 4 can be continuously operated when the first bridge circuit 4 is operated independently, and the maximum current Imax2 at which the second bridge circuit 6 can be continuously operated when the second bridge circuit 6 is operated independently.

Consequently, it is possible to more reliably prevent the switching of the carrier wave from being frequently performed in the scene where the output of the first bridge circuit 4 or the second bridge circuit 6 is near zero. Further, the magnitude of ripple current and the temperature rise of the smoothing capacitor 3 can be suppressed within the current value range that can be continuously output by one of the bridge circuits.

While the embodiments of the present invention have been described above, the above-described embodiments only show part of application examples of the present invention and are not intended to limit the technical scope of the present invention to the specific configurations of the above-described embodiments.

For example, in each of the above-described embodiments, the description has been given of the example in which the two three-phase bridge circuits (the first bridge circuit 4 and the second bridge circuit 6) drive the two three-phase motors (the first motor 7 and the second motor 8). However, the number of the phases is not limited to three. For example, the configuration of the present invention is likewise applicable to motors of four or more phases, multiphase bridge circuits, and so on. Further, the numbers of phases of the first bridge circuit 4 and the second bridge circuit 6 may differ from each other.

In each of the above-described embodiments, the description has been given of the example in which the carrier wave is the triangular wave. However, the carrier wave is not limited to the triangular wave. Even in the case of a carrier wave of another type, such as a sawtooth carrier wave or a square wave, the present invention is likewise applicable thereto by modifying the respective formulas described in the above-described embodiments, as appropriate.

Further, with respect to the pulse time sum threshold value (e.g. the threshold time $\Delta t\_x\_th$ in the first embodiment) and the pulse time threshold value (e.g. the pre-switching pulse time threshold value $\Delta ta\_x\_th$ or the first post-switching pulse time threshold value $\Delta tb\_x1\_th$ in the second embodiment), it is preferable to set these threshold values to the same value in terms of limiting the occurrence of an ON-pulse time or an OFF-pulse time less than a lower limit time that is not allowable. However, within a range that can limit the occurrence of the ON-pulse time or the OFF-pulse time less than the lower limit time, the pulse time sum threshold value and the pulse time threshold value may be set to different values as appropriate according to various other conditions that should be considered.

In each of the above-described embodiments, the description has been given of the case in which, particularly, the phase difference $\phi$ between the first carrier wave and the second carrier wave is 90 degrees. However, the phase difference $\phi$ is not limited to 90 degrees. Further, the phase difference $\phi$ may be changed according to the operating state of the first motor 7 or the second motor 8, and the respective calculations relating to a determination on the carrier wave switching may be performed according to the phase difference $\phi$ changed.

In each of the above-described embodiments, the description has been given of the manner in the case where the inductive load is the motor. However, the present invention is also applicable to a load, other than the motor.

Further, in the timing chart used for the description of each of the above-described embodiments, there is illustrated the example in which when the reference timing Tde is set to a peak (trough), the virtual switching timing Tch is set to a next trough (peak). However, the various calculations relating to a determination on the carrier wave switching may be performed by setting the reference timing Tde to a peak (trough) and, likewise, setting the virtual switching timing Tch to a next peak (trough). Alternatively, by setting the reference timing Tde to a peak (or a trough) and setting the virtual switching timings Tch to both a next peak and a next trough, a determination on the carrier wave switching may be made from the results of calculations that are performed based on the respective set virtual switching timings Tch.

In each of the above-described embodiments, a determination on the carrier wave switching is performed between the first carrier wave (Ca1_X) generated by the first carrier wave generator 52 and the second carrier wave (Ca2_X) generated by the second carrier wave generator 54. However, in the configuration in which a single carrier wave generator can output two carrier waves with different phases and one of the two carrier waves is commanded as the carrier wave for generating PWM signals for the second bridge circuit 6, the configuration of the above-described embodiment may be applied by assuming the two carrier waves as the first carrier wave (Ca1_X) and the second carrier wave (Ca2_X), respectively.

The invention claimed is:

1. A power conversion control method including:
   generating PWM signals that are output to a first and a second single-phase or multiphase bridge circuit connected in parallel to a DC power supply and respectively connected to inductive loads; and
   selecting one of a first carrier wave for outputting the PWM signal to the first bridge circuit and a second carrier wave with a predetermined phase difference to the first carrier wave, and based on the carrier wave selected, performing switching control of the carrier wave for outputting the PWM signal to the second bridge circuit,
   the power conversion control method comprising:
   in the switching control of the carrier wave,
   calculating a pre-switching pulse time being a time from a first conductive state switching timing being a conductive state switching timing of the second bridge circuit immediately before a predetermined carrier wave switching timing, to the carrier wave switching timing;
   calculating a post-switching pulse time being a time from the carrier wave switching timing to a second conductive state switching timing being an initial conductive state switching timing after the carrier wave switching timing;
   when a conductive state of the second bridge circuit is not switched at the carrier wave switching timing, determining that switching of the carrier wave is disabled when a sum of the pre-switching pulse time and the post-switching pulse time is less than a predetermined pulse time sum threshold value; and
   when the conductive state of the second bridge circuit is switched at the carrier wave switching timing, determining that the switching of the carrier wave is disabled when the pre-switching pulse time or the post-switching pulse time is less than a predetermined pulse time threshold value.

2. The power conversion control method according to claim 1, wherein:
   in the switching control of the carrier wave,
   a timing at which the use carrier wave currently used is at at least one of a peak and a trough is set as a reference timing; and
   a timing at which a value of the use carrier wave and a value of the carrier wave not used agree with each other after the reference timing is set as the carrier wave switching timing.

3. The power conversion control method according to claim 1, wherein:
   in the switching control of the carrier wave,
   a timing at which the use carrier wave currently used is at at least one of a peak and a trough is set as a reference timing; and
   a timing at which the use carrier wave is at at least one of a peak and a trough next after the reference timing is set as the carrier wave switching timing.

4. The power conversion control method according to claim 1, wherein the pre-switching pulse time and the post-switching pulse time are calculated based on the phase difference between the first carrier wave and the second carrier wave, a carrier wave frequency, and a modulation factor.

5. The power conversion control method according to claim 1, wherein the pulse time sum threshold value or the pulse time threshold value is determined based on at least one of a semiconductor temperature, a circuit characteristic, and a semiconductor characteristic of the second bridge circuit.

6. The power conversion control method according to claim 1, further comprising determining that the switching of the carrier wave is disabled when a sum of a phase current effective value output from the first bridge circuit and a phase current effective value output from the second bridge circuit is equal to or less than a predetermined threshold current.

7. The power conversion control method according to claim 6, wherein the threshold current is set to be equal to or less than a higher value of a maximum value of the phase current effective value of the first bridge circuit and a maximum value of the phase current effective value of the second bridge circuit.

8. The power conversion control method according to claim 6, wherein the threshold current is set to be equal to or less than a higher value of a maximum current value at which the first bridge circuit can be continuously operated when the first bridge circuit is operated independently, and a maximum current value at which the second bridge circuit can be continuously operated when the second bridge circuit is operated independently.

9. A power conversion control device including a first and a second single-phase or multiphase bridge circuit connected in parallel to a DC power supply and respectively connected to inductive loads; and a control device configured to generate PWM signals that are output to the first bridge circuit and the second bridge circuit, the control device comprising:
a first carrier wave generator configured to generate a first carrier wave for outputting the PWM signal to the first bridge circuit;
a second carrier wave generator configured to generate a second carrier wave with a predetermined phase difference to the first carrier wave; and
a carrier wave switching unit configured to select one of the first carrier wave and the second carrier wave, and based on the carrier wave selected, perform switching control of the carrier wave for outputting the PWM signal to the second bridge circuit, the carrier wave switching unit comprising:
a pre-switching pulse time calculation unit configured to calculate a pre-switching pulse time being a time from a first conductive state switching timing being a conductive state switching timing of the second bridge circuit immediately before a predetermined carrier wave switching timing, to the carrier wave switching timing; and
a post-switching pulse time calculation unit configured to calculate a post-switching pulse time being a time from the carrier wave switching timing to a second conductive state switching timing being an initial conductive state switching timing after the carrier wave switching timing, the carrier wave switching unit configured to:
when a conductive state of the second bridge circuit is not switched at the carrier wave switching timing, determine that switching of the carrier wave is disabled when a sum of the pre-switching pulse time and the post-switching pulse time is less than a predetermined pulse time sum threshold value; and
when the conductive state of the second bridge circuit is switched at the carrier wave switching timing, determine that the switching of the carrier wave is disabled when the pre-switching pulse time or the post-switching pulse time is less than a predetermined pulse time threshold value.

* * * * *